US012571229B2

(12) United States Patent
Okurogullari

(10) Patent No.: US 12,571,229 B2
(45) Date of Patent: Mar. 10, 2026

(54) MODULAR WIND TOWER

(71) Applicant: Aydin Okurogullari, Istanbul (TR)

(72) Inventor: Aydin Okurogullari, Istanbul (TR)

(*) Notice: Subject to any disclaimer, the term of this patent is extended or adjusted under 35 U.S.C. 154(b) by 115 days.

(21) Appl. No.: 18/250,237

(22) PCT Filed: Oct. 24, 2020

(86) PCT No.: PCT/TR2020/050987
§ 371 (c)(1),
(2) Date: Apr. 24, 2023

(87) PCT Pub. No.: WO2022/086461
PCT Pub. Date: Apr. 28, 2022

(65) Prior Publication Data
US 2024/0044165 A1    Feb. 8, 2024

(51) Int. Cl.
*E04H 12/08*      (2006.01)
*F03D 13/20*      (2016.01)
(52) U.S. Cl.
CPC ......... *E04H 12/085* (2013.01); *F03D 13/201* (2023.08); *F05B 2230/60* (2013.01)
(58) Field of Classification Search
CPC ..... E04H 12/085; E04H 12/08; F03D 13/201; F03D 13/10; Y02E 10/72; Y02E 10/728
See application file for complete search history.

(56) References Cited

U.S. PATENT DOCUMENTS 8,590,276 B2    11/2013  Kryger
2009/0021019 A1*  1/2009  Thomsen ............... E04H 12/085
                                             290/55

2010/0031927 A1    2/2010  Notaro et al.
2021/0148335 A1*   5/2021  Kersten ................. E04H 12/085
2022/0259882 A1*   8/2022  Chambers ................ E04C 3/36
2024/0044165 A1*   2/2024  Okurogullari ......... F03D 13/10

FOREIGN PATENT DOCUMENTS

| CN | 106438212 | A | 2/2017 | |
| DE | 102017120487 | A1 | 3/2019 | |
| DK | 2545231 | T3 | 10/2015 | |
| EP | 1561883 | A1 | 8/2005 | |
| EP | 2006471 | A1 | 12/2008 | |
| KR | 20150002183 | A | 1/2015 | |
| KR | 20150114073 | A | * 10/2015 | |
| KR | 101696019 | B1 | * 1/2017 | |
| WO | 2004083633 | A1 | 9/2004 | |
| WO | 2005075763 | A2 | 8/2005 | |
| WO | WO-2009097858 | A1 | * 8/2009 | ........... E04H 12/085 |

OTHER PUBLICATIONS

Translation of Korean Patent 10-1696019 (Year: 2017).*
English Translation of WO 2009097858 (Year: 2009).*
English Translation of KR 20150114073 (Year: 2015).*

* cited by examiner

*Primary Examiner* — Andrew J Triggs
(74) *Attorney, Agent, or Firm* — Elmore Patent Law Group, P.C.; Joseph C. Zucchero; Carolyn S. Elmore

(57) ABSTRACT

A modular wind turbine tower is related to the faster and easier production, transportation and assembly processes of wind turbine towers with a height of more than 100 meters, which become difficult due to the tower diameter and material thickness increasing towards the base as the height increases.

5 Claims, 28 Drawing Sheets

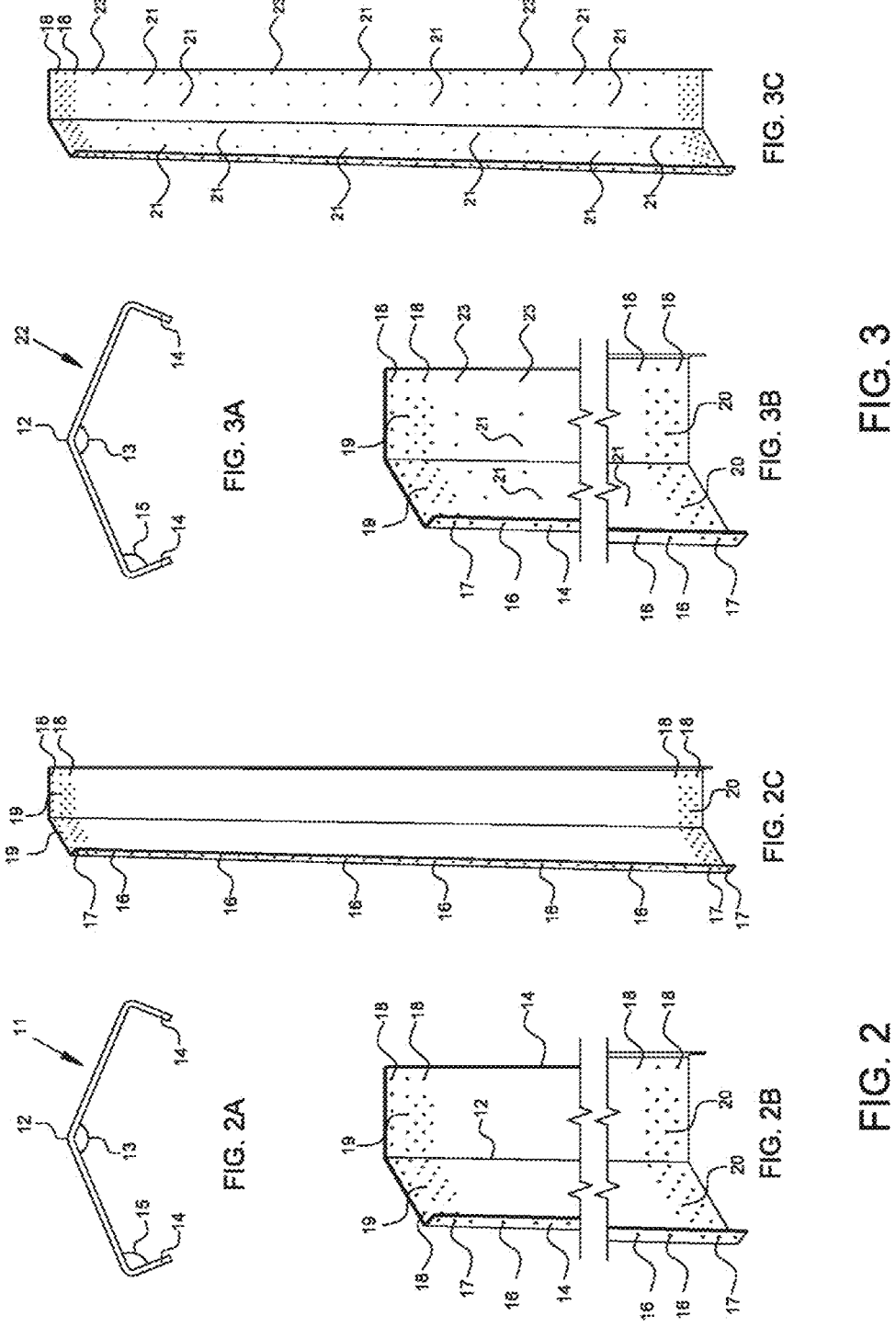

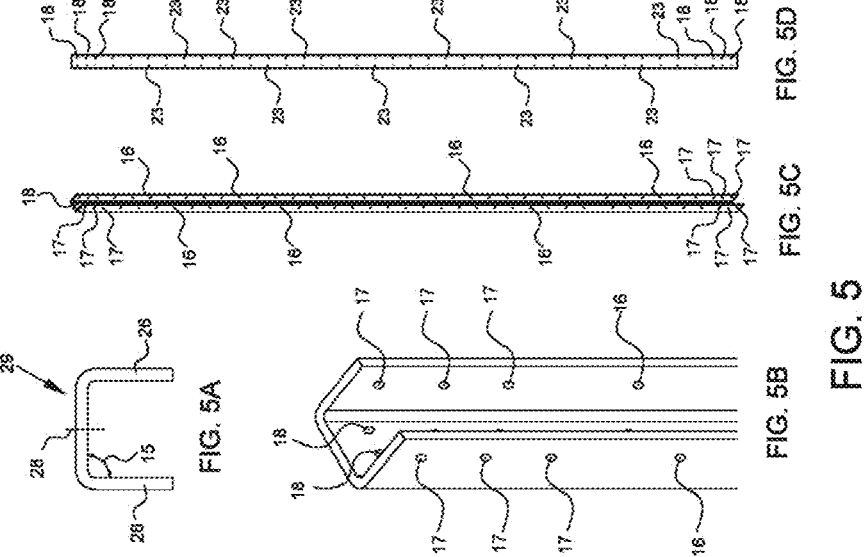
FIG. 5A
FIG. 5B
FIG. 5C
FIG. 5D
FIG. 5
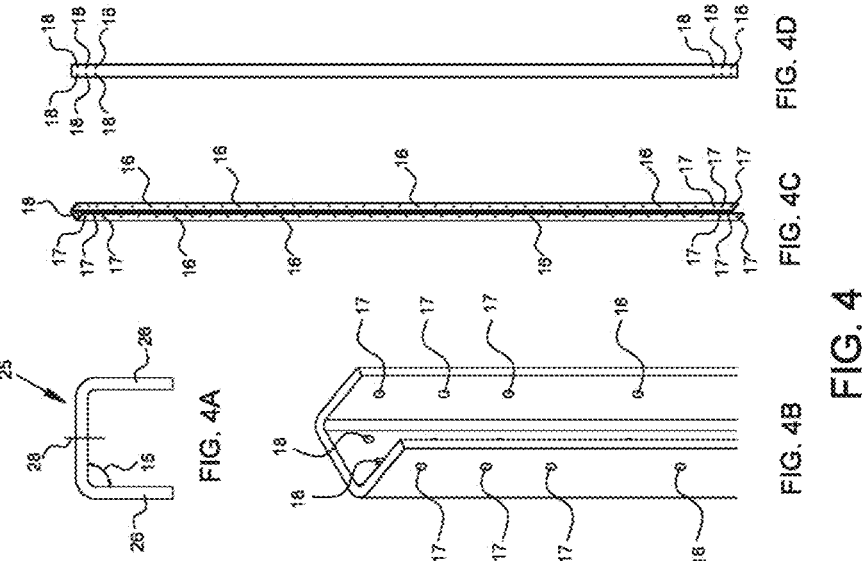
FIG. 4A
FIG. 4B
FIG. 4C
FIG. 4D
FIG. 4

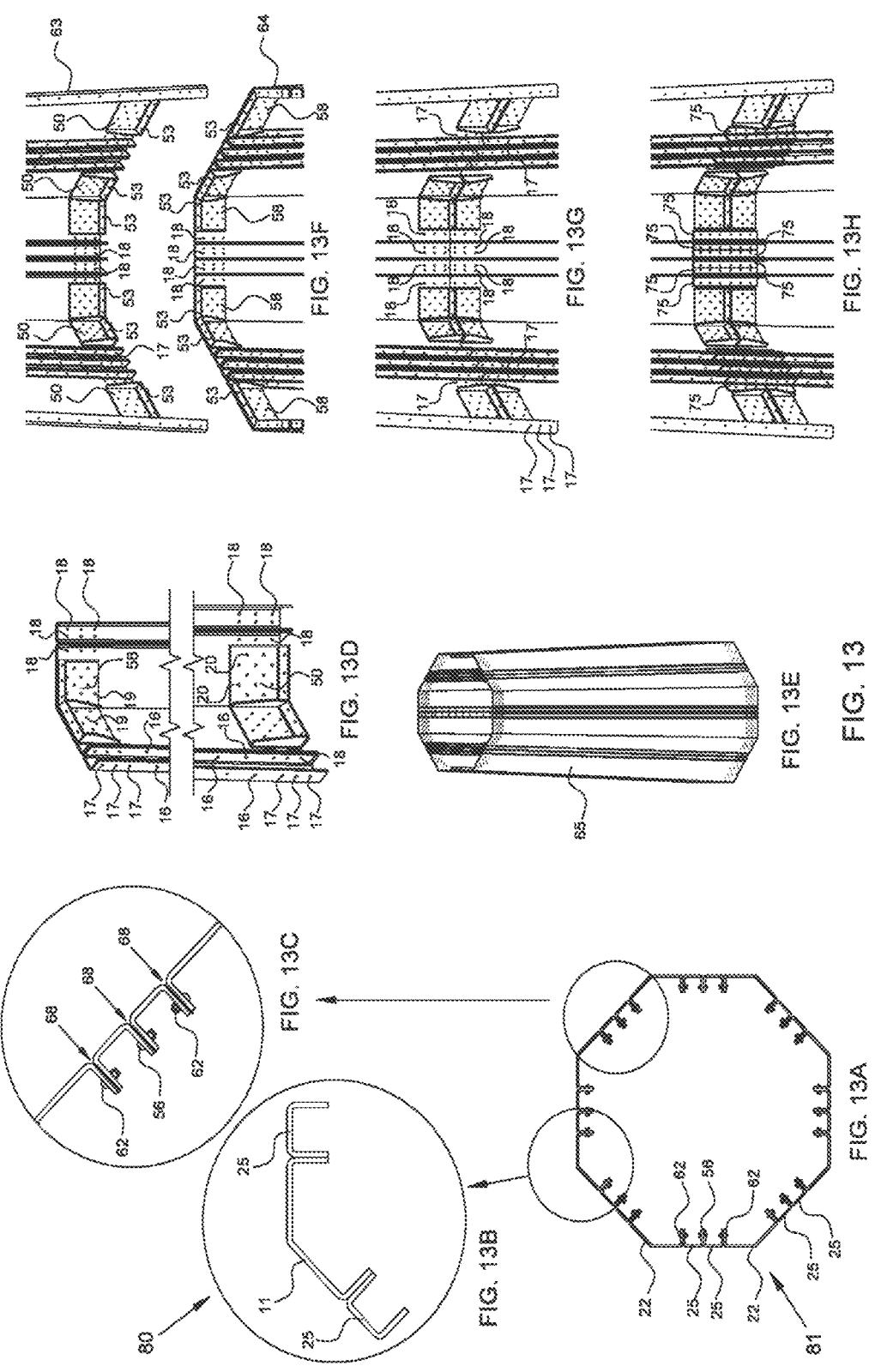

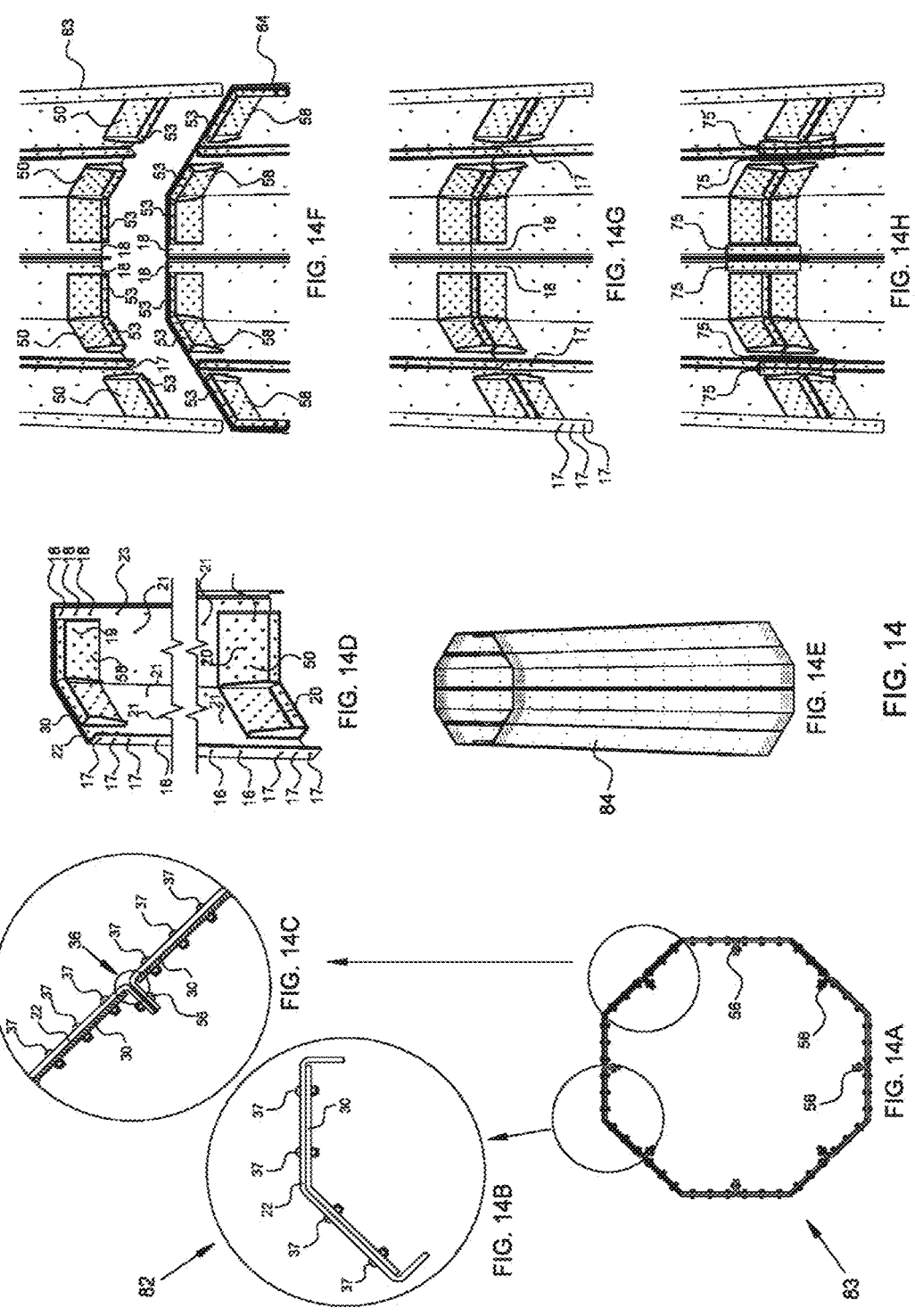

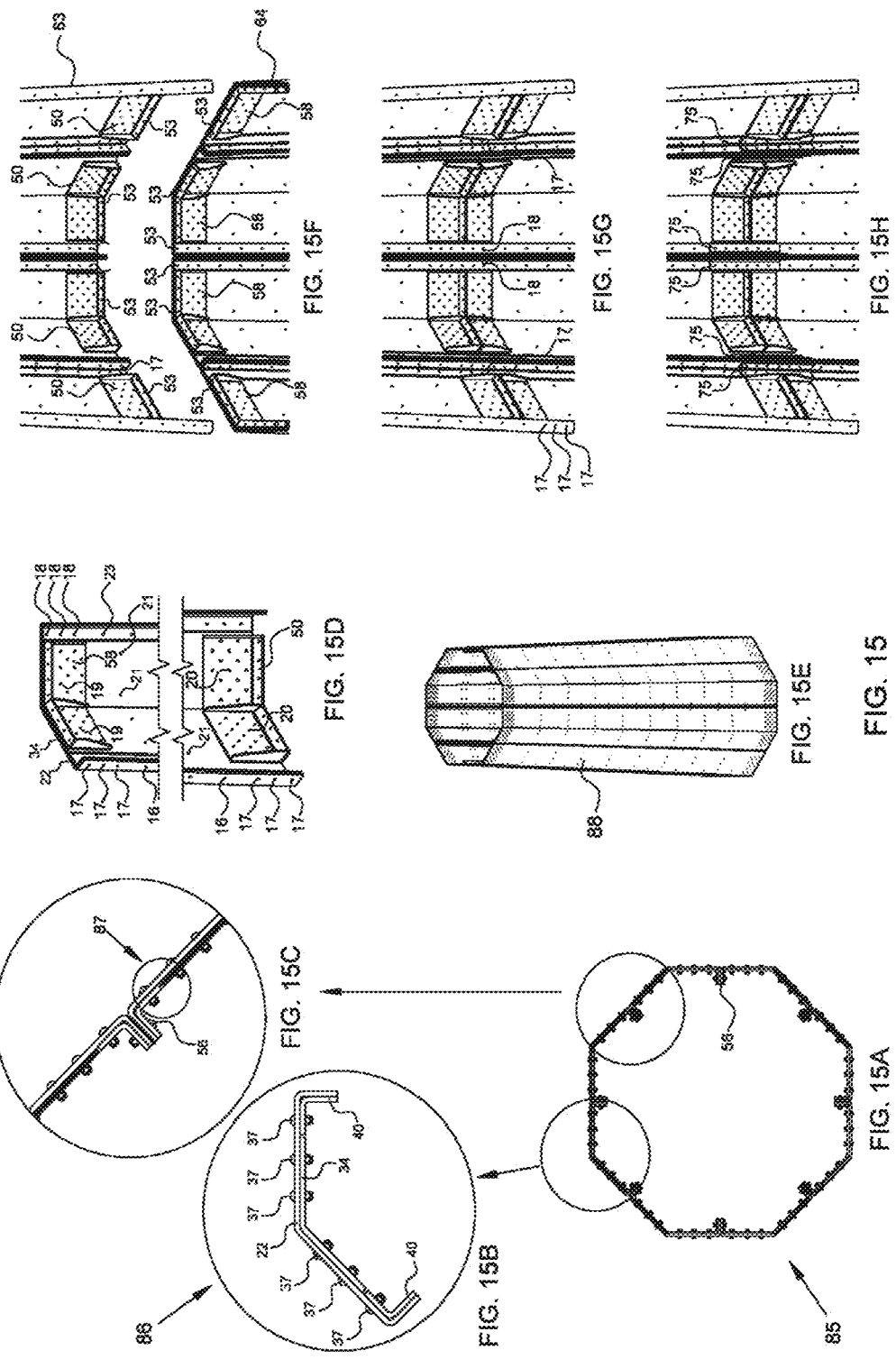

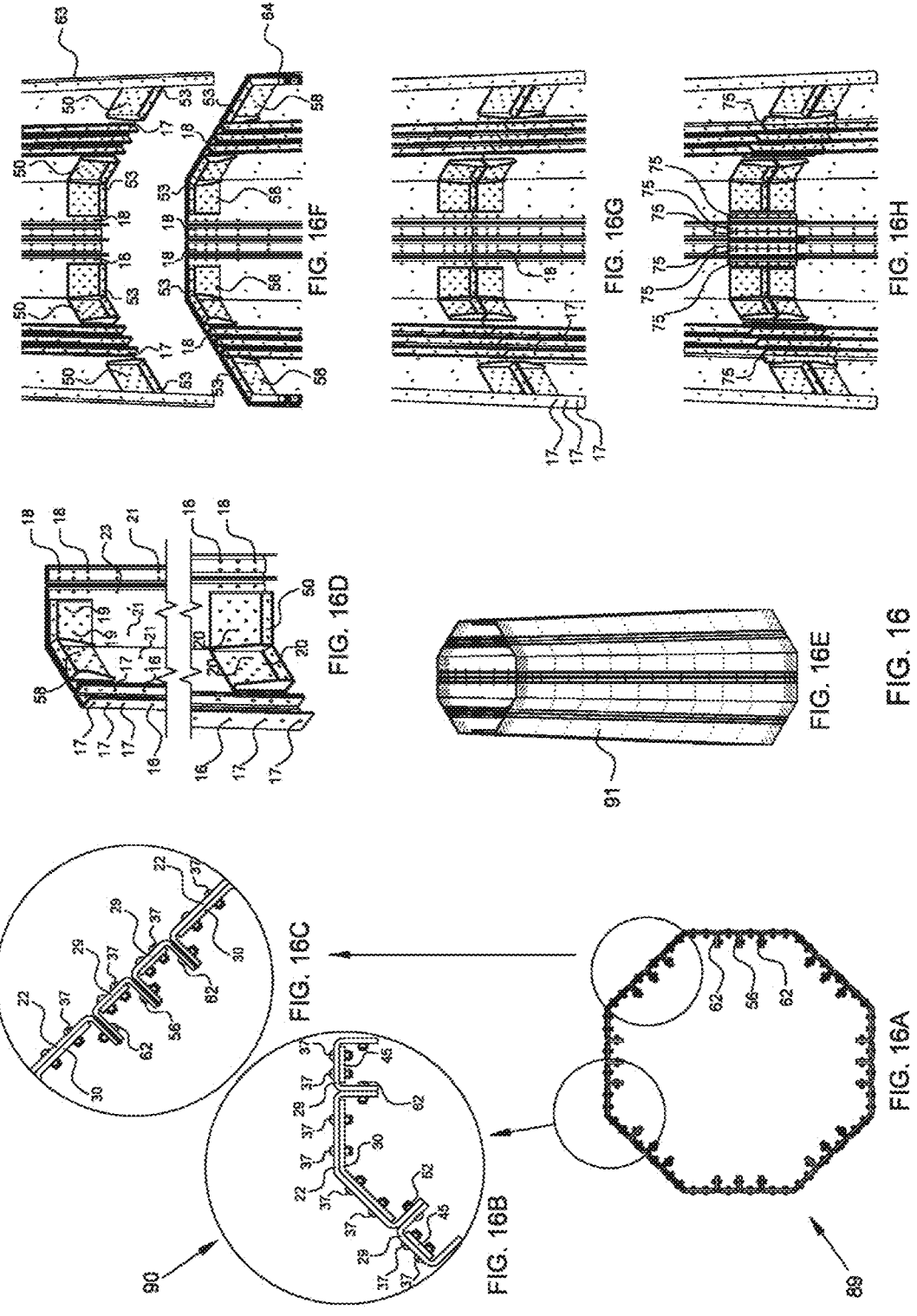

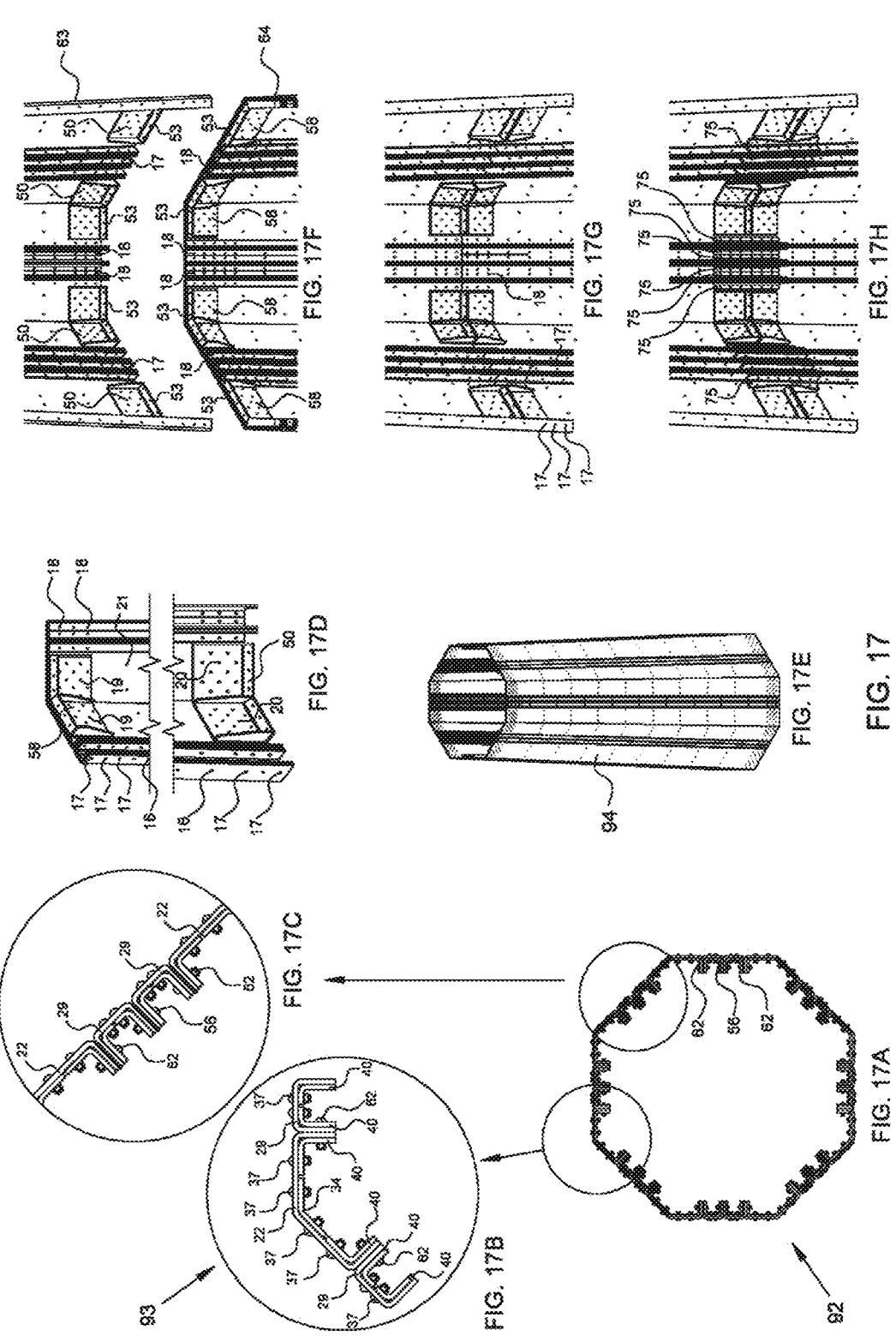

Cross section A-A

MM-02

Cross section B-B

MM-03

Cross section C-C

MM-04

Cross section D-D

Cross section E-E

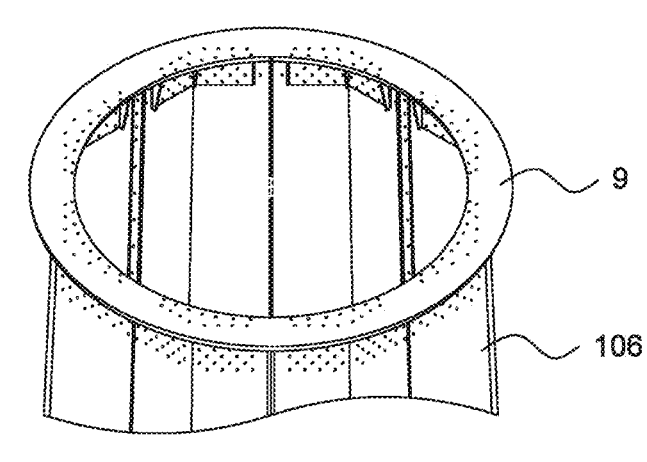
FIG. 22C
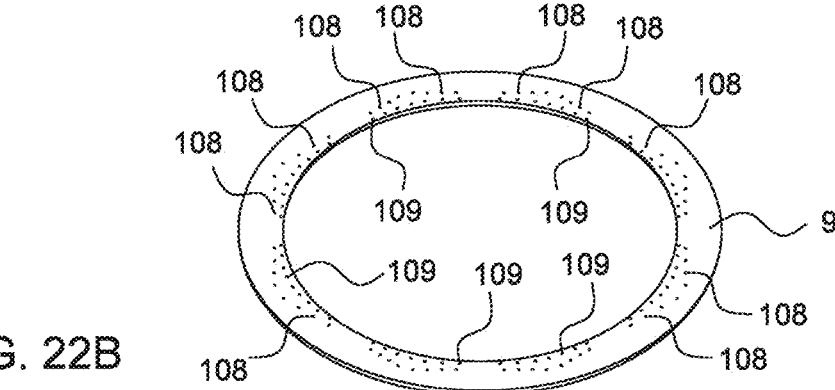
FIG. 22B
FIG. 22A

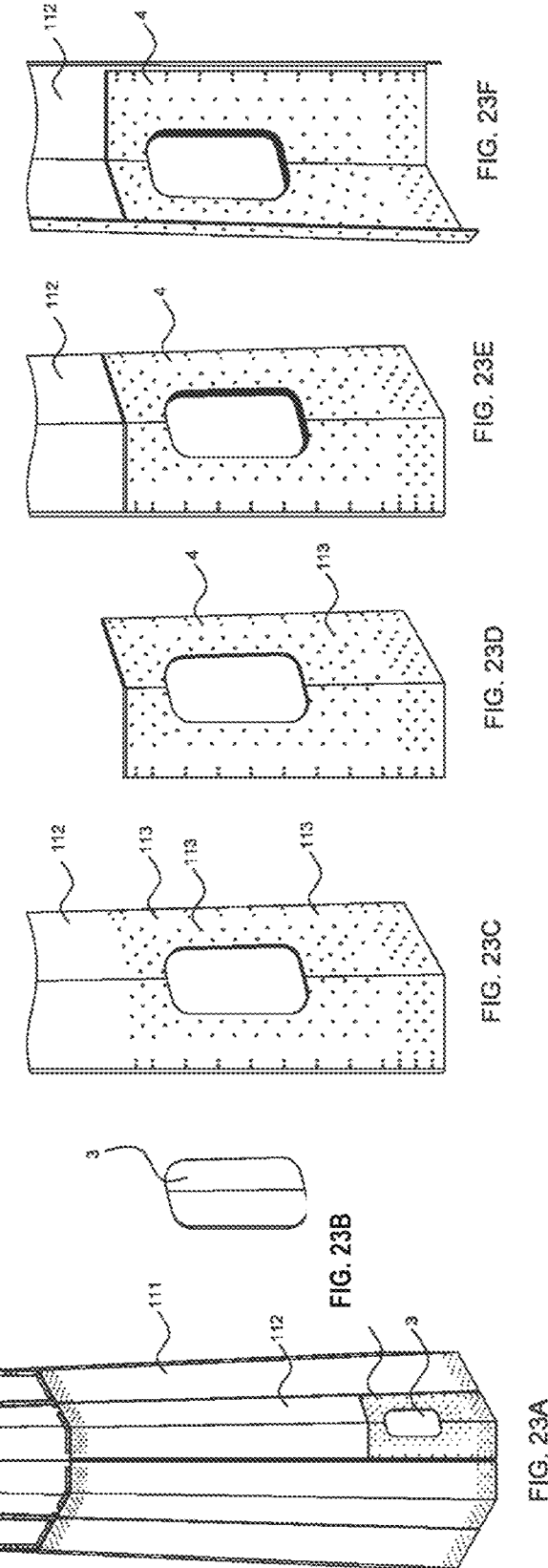

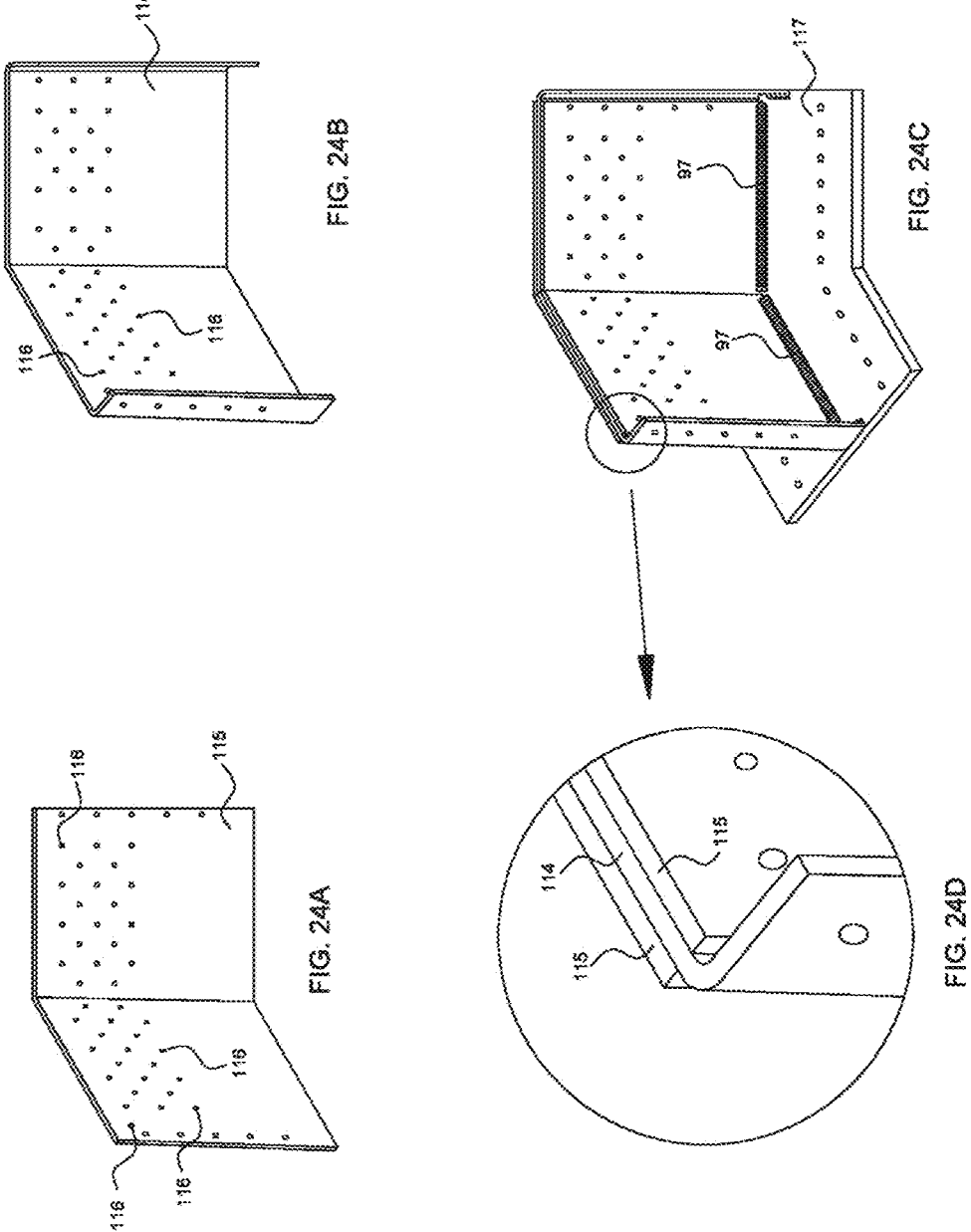

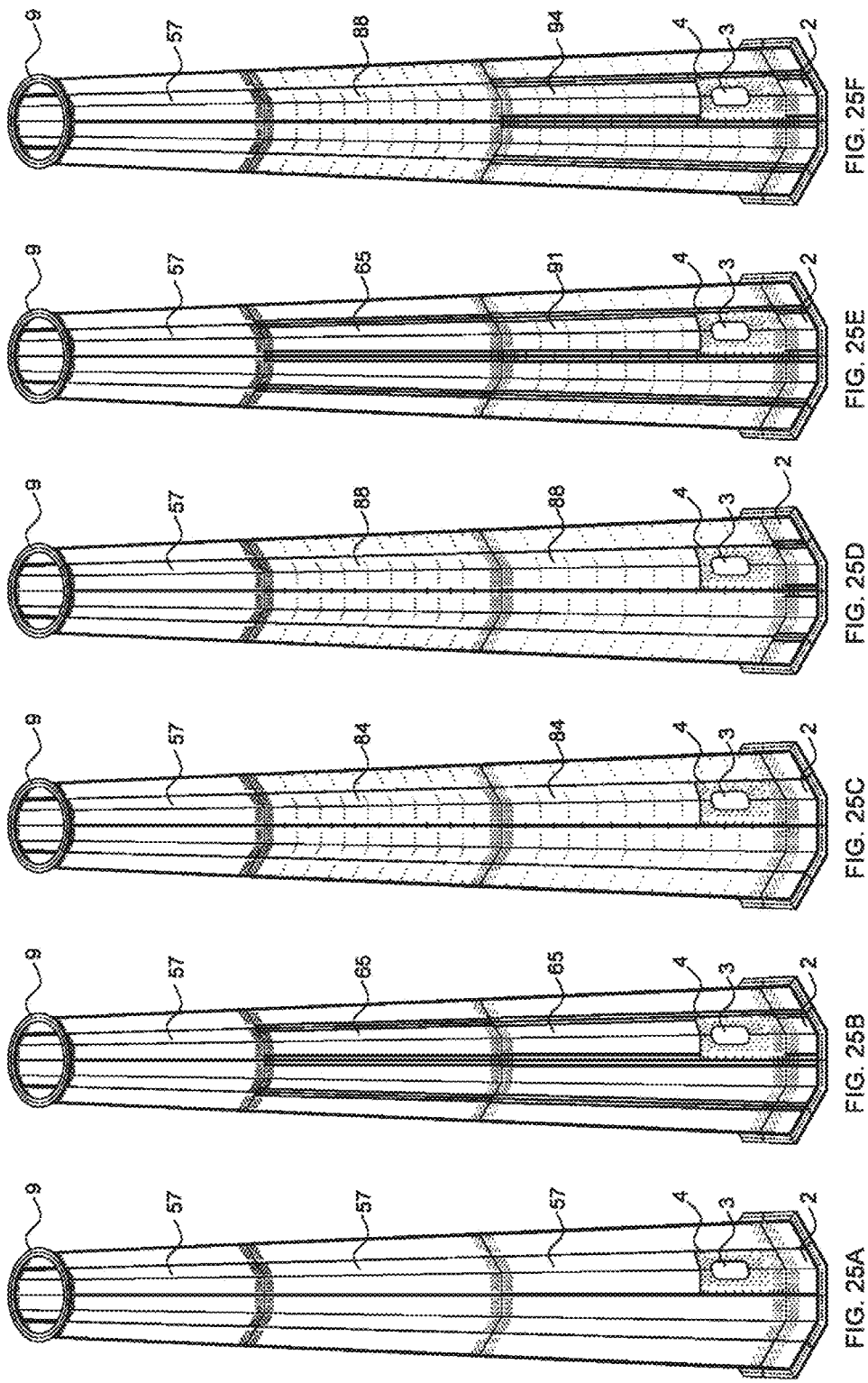

MODULAR WIND TOWER

CROSS REFERENCE TO THE RELATED APPLICATIONS

This application is the national phase entry of International Application No. PCT/TR2020/050987, filed on Oct. 24, 2020, the entire contents of which are incorporated herein by reference.

TECHNICAL FIELD

The present invention relates to a modular tower with an upwardly tapering conical structure, preferably for a wind turbine, consisting of modules of polygonal cross-section attached one above the other.

BACKGROUND

Various types of towers are used in wind turbines. These are lattice towers, cylindrical-conical steel towers, concrete towers and hybrid (lower section reinforced concrete, upper section cylindrical conical steel) and modular towers.

Lattice type towers are not preferred because of their appearance. There are also technical difficulties in making it longer than 70-80 meters.

In the last 10-15 years, cylindrical conical steel towers have been used the most. These towers are produced in the factories with a length of 20-30 meters by shaping steel plates in roller machines and welding to each other. It is transported to the assembly site with long and wide vehicles and final assembly is made. There are some restrictive situations such as the maximum diameter of 4.3 m for this type of towers to be transported on highways, and transport trucks must be allowed to go to traffic with special permits.

In addition, the costs of the roads to be opened in the area where the wind power plant will be established must be made according to these vehicles, and it is necessary to use more space to open a road. The maximum base diameter of 4.3 m limits the natural frequency and strength capacity of the tower as well as the height of the tower to 85-90 meters.

In recent years, hybrid towers made of concrete and steel have also been used. The cost of reinforced concrete parts of this type of towers is somewhat cheaper than steel. However, longer manufacturing and assembly times and higher transportation costs seem to be disadvantages.

In the patent document numbered WO 2004083633, a solution is known in which the segments of a tower element are manufactured in three longitudinal parts at the factory and assembled after being transported to the assembly site. Wind turbine towers are constantly exposed to vibration due to wind and working loads. It is known that weld joints are subjected to fatigue loads that cause failure over time.

In patent document No. WO2005075763, NPI flanges were used along the tower, with the parts arranged laterally with an offset corresponding to 50% to 75% of the length of the section. Here, too, there are difficulties in mounting.

In the document no. DK 2545231, it is mentioned to combine the flanges of the overlapping segments of different lengths. In this method, most of the loads on the tower are transmitted to the foundation through only the flange sections.

In EP 1 561 883 A1 a tower for a wind turbine is described. The tower elements forming the segments of the module are characterized by a rectangular structure with flanges. Also, circular flanges were used throughout the tower.

Document US 2009/0021019 A1 discloses a modular tower that is transformed into modules by combining flat plate segments with V-section pieces. There are difficulties in using multiwalled steel and composite materials in the mentioned structure.

In the patent documents U.S. Pat. No. 8,590,276 B2 and US 20100319276, modular tower construction for wind power plant is mentioned. Around the tower element are flanges facing inward at the longitudinal sides for mounting on the respective flanges. While the modules are assembled to each other, these parts are made in two axes (x and z) with an overlap on the outer surface at the transverse joints and a butt joint at the inward facing flanges. In the document mentioned, flange lengths are shorter than the tower element and there are overlapping sections in the assembly of the modules to each other. Most of the tower loads are transmitted to the foundation only along the flange sections in the module connection areas, not through the entire module section. This situation appears to be a disadvantage. Multiwall steel or steel-composite material variations can be used to build taller towers according to the invention. It is an advantage that the tower elements are the same in length in order to transmit the loads on the tower to the foundation equally in all sections throughout the tower. It is technically more advantageous to assemble the modules to each other in three axes.

According to the invention, the bottom section of the upper module and the outer circumference of the ceiling section of the lower module are equal. The lengths of the tower elements that make up the modules are also equal. Module connection parts, thanks to their different structures, allow the modules to be joined to each other in three axes. Thus, different from the documents mentioned above;

Single or multi-skin tower elements can be made,

Some of the tower elements can be made of composite material,

Single or multi-walled modules with different structures can be made using the same or similar tower elements, Tower elements (30, 34, 38, 39) used as interior walls can be made of composite material, reducing the weight of the tower and increasing the natural frequency of the tower, Optimization can be achieved in tower design by using the same or different modules, Loads affecting the tower are transmitted to the foundation continuously through all tower elements.

Thanks to the structure of the module fasteners, the modules can be rigidly and securely attached to each other in three axes, Thanks to the structure of the module connectors (50 and 58) and the assembly of the segments at the factory, the assembly labor and assembly time in the switchboard area can be reduced by at least 25-30%.

SUMMARY

The aim of the invention is to provide a solution to make the production, transportation and assembly processes easier due to the tower diameter and material thickness increasing towards the base as the height increases in wind turbine towers with high height.

The invention preferably relates to a wind turbine tower, which is constructed by superimposing modules of conical structure, narrowing from bottom to top, whose outer section is equilateral polygonal.

According to the invention, the number of sides of the rhombus forming the outer appearance of the cross section can be 6, 8, 10, 16 or more in order to make the production and transportation processes easier according to the height and diameter of the tower.

As the tower height increases, the base diameter increases to maintain the balance of the tower. It can be made in two, three or more pieces instead of one piece to be able to transport the tower elements that make up the tower modules with a large base diameter with standard trucks.

In high towers, the thickness of the material increases in the lower sections close to the foundation, reaching the thickest value in the connection area to the foundation. The length of the tower elements forming the perimeter of the module is 12-13 meters, making it difficult to bend the tower elements as the material thickness increases. This situation requires the machines used in production and the transportation equipment in the factory to be of higher capacity and volume and higher power, the movements of the material in the production stages slow down, causing the investment costs to increase, more energy to be used and the production time to be prolonged.

According to the invention, tower elements in the lower modules of the tower with a high material thickness can be made with multiple (two or more) walls instead of single-walled steel. These walls can be made of steel material. Some of the tower elements forming the inner or outer walls can be made of composite material to reduce tower weight.

According to the invention, ten different types of tower elements are described. Ten different structures of tower modules have been described using one or more of these tower elements. Towers can be designed to provide the optimum solution by using one or more of these modules. According to the invention, the bottom section of the upper module and the outer circumference of the ceiling section of the lower module are equal. The lengths of the tower elements that make up the modules are also equal. The modules are assembled to each other in vertical and horizontal axes. Six different types of tower connection elements have been described for the assembly. Flanges in the tower segments on the vertical axis of the tower are made with I or L section steel pieces, and on the horizontal axis, module fittings mounted on the lower and upper edges of the tower elements. With this method, both ease of assembly and a much stronger structure compared to welded joints are provided.

According to the invention, nearly all of the tower members are connected by bolt-nut or rivet connections. Only basic connection module and some module connectors have welding process. In this way, it is ensured that the dangers that fatigue loads will cause in the source regions are minimized.

After the tower elements produced in the factory are transported to the place where the wind power plant will be built, firstly the tower elements are added to each other on the ground and the modules are assembled. Then the modules are added on top of each other and the tower is assembled.

According to the invention, the module connection elements allow the modules to be connected to each other in three axes thanks to their different structures.

Modules with a high material thickness at the bottom can be made shorter instead of 12 meters in order to facilitate manufacturing and assembly processes.

The steel basket foundation connection with the tower embedded in the concrete foundation is made with the foundation module. This module, whose height is around one meter, is fixed to the base upper flange of the parts produced in accordance with the profile of the tower section by welding, and then the base lower flanges and the foundation are mounted with nuts and bolts.

According to the invention, it is possible to use methods such as galvanized coating, cataphoresis coating, painting, etc., of all tower elements. In this way, it is an advantage that the surface corrosion resistance can be increased.

A flange can be attached to the upper part of the top segment for nacelle mounting. The connection of the flange to the tower elements forming the segment can be made with steel parts and bolts-nuts or rivets.

BRIEF DESCRIPTION OF THE DRAWINGS

In order to achieve the aim of the invention, the figures showing the parts of the modular wind turbine tower to be produced are briefly explained below.

FIG. 2 Shows the single skin tower element

FIG. 3 Shows the outer skin of the multi-skin tower element

FIG. 4 Shows the single-walled U-shaped tower element

FIG. 5 Shows the outer skin of the multi-skin U-shaped tower element

FIG. 13 Shows a tower module with segments with multiple parts and one wall

FIG. 14-1 Shows a tower module with segments in one piece and multiple walls

FIG. 15-1 Shows a tower module with segments of one piece and multiple walls

FIG. 19-1 Shows the mounting method (MM-02) of modules with different material thicknesses and the same cross sections.

FIG. 19-2 Shows the mounting method (MM-03) of modules with the same material thicknesses and different cross sections FIG. 20 Shows the mounting method (MM-04) of modules with different material thicknesses and sections.

FIG. 20-1 Shows an alternative mounting method (MM-05) for modules with different material thicknesses FIG. 21 Shows the basic connectivity module FIG. 22 Shows the top flange FIG. 23 Shows the door and doorway and reinforcement plate FIG. 24 Base connection module shows reinforcement plate FIG. 25 Shows the tower models made using different modules.

FIG. 26 Shows a sample tower view at 145 m height.

EXPLANATION OF REFERENCES IN FIGURES

Figure 1:
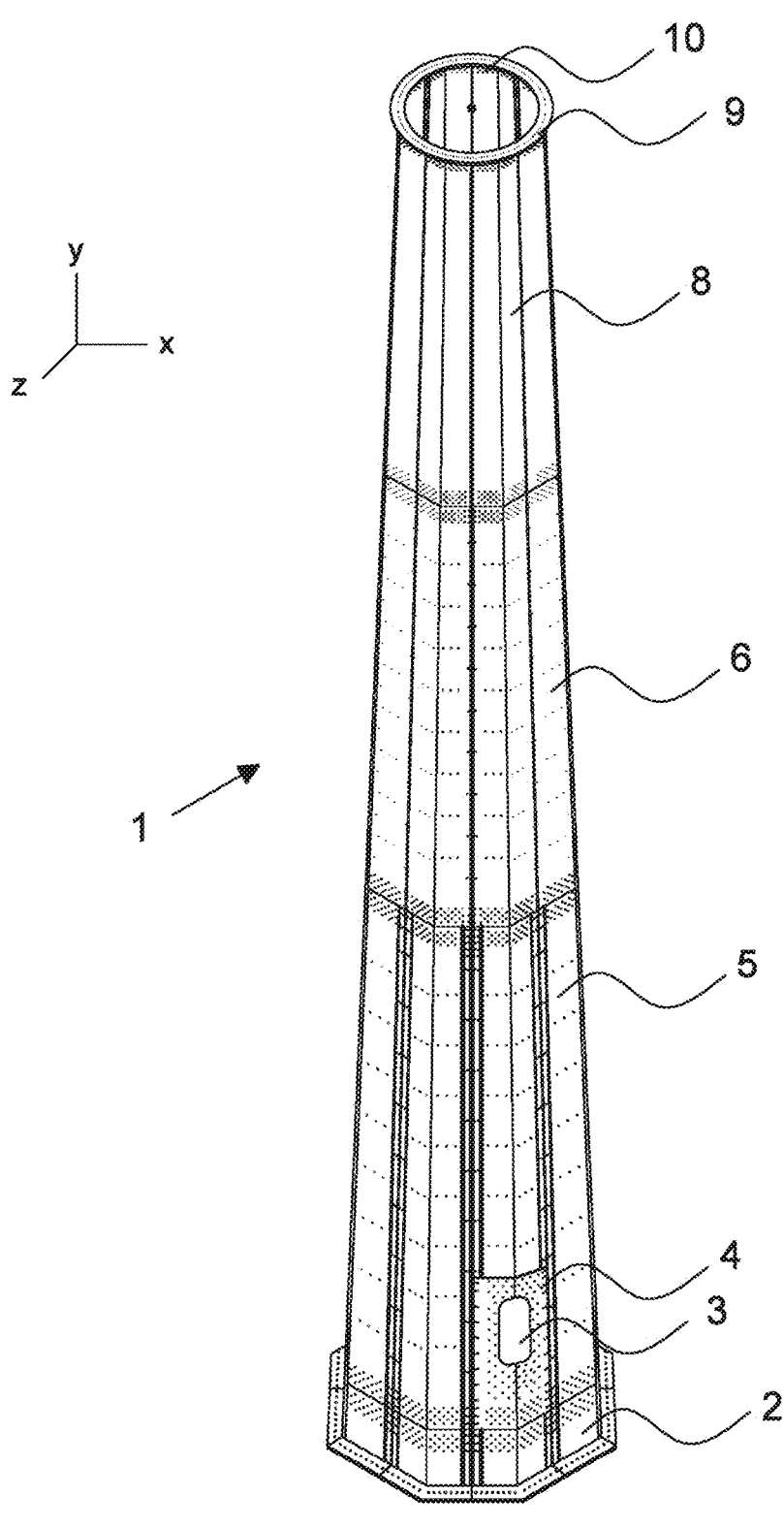
FIG. 1 Shows the perspective view of the modular wind turbine tower
Figure 6:
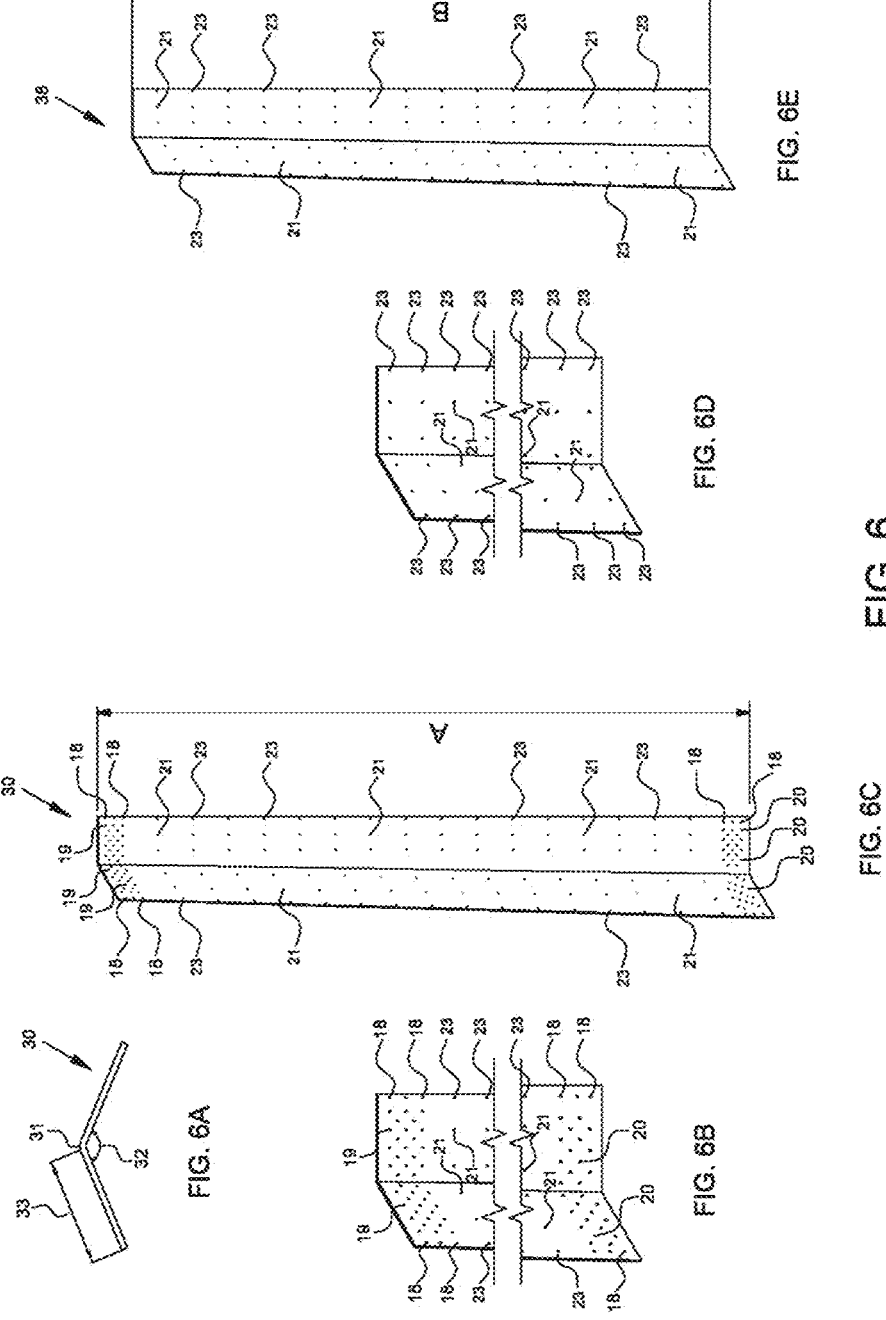
FIG. 6 Inner wall middle part shows the tower element
Figure 7:
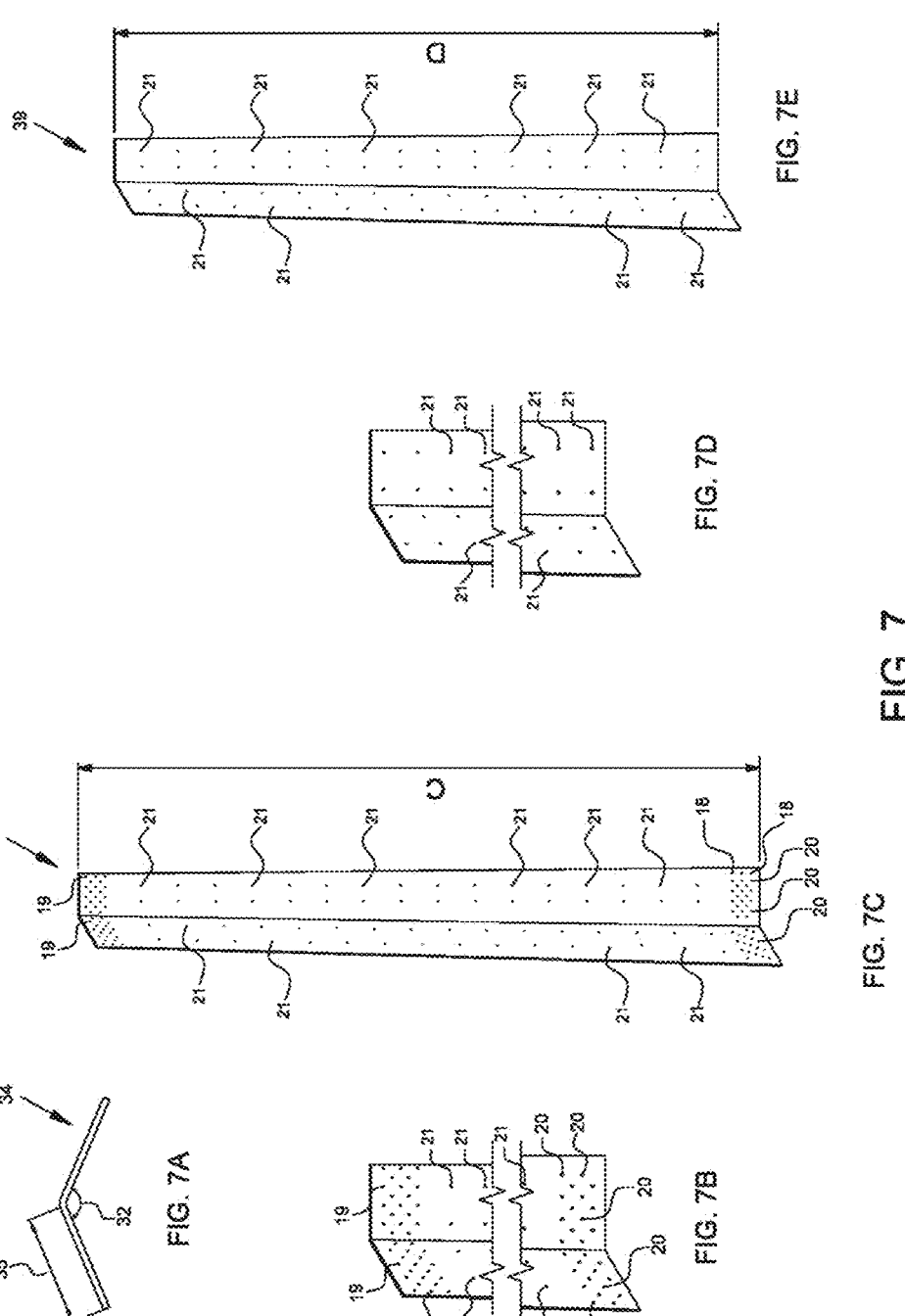
FIG. 7 Inner wall middle part shows the tower element

1 Tower
2 Foundation module
3 Door
4 Reinforcement plate
5 Lower module
6 Middle module
8 Upper module
9 Top flange
10 Flange connector
11 tower element
12 Bending line
13 Bending angle
14 Flange
15 angle
16 Bolt hole
17 Bolt hole
18 Bolt hole
19 Bolt hole
20 Bolt hole
21 Bolt hole
22 tower element
23 Bolt hole
25 tower element
26 Flange
28 Middle axis
29 tower element
30 Tower element
31 Bend line
32 Bending angle
33 Width
34 Tower element
35 Width
36 Flange detail
37 Bolt
38 Tower element
39 Tower element
40 Tower element
41 Flange
42 90 degree angle
45 Tower element
46 Cross section
50 Module connector
51 Bending line
52 Flange
53 Bolt hole
54 Welding seam
55 Reinforcement part
56 Bolt
57 module
58 Module connector
59 Flange
60 Welding seam
61 Reinforcement part
62 Bolt
63 module
64 module
65 Module
68 Sealing material
70 Reinforcement plate

73 Reinforcement plate
74 Reinforcement plate
75 Module connection part
76 90 degree angle
77 Flange
78 segment
79 Cross section
80 segment
81 Cross section
82 segment
82A segment
83 Cross section
84 module
84A module
85 Cross section
86 segment
86A segment
87 Flange width detail
88 module
88A module
89 Cross section
90 segment
90A segment
91 module
91A module
92 Cross section
93 segment
93A segment
94 module
94A module
95 Tower element
96 connection plate
97 Welding seam
98 Bolt hole
99 Tower element
100 Foundation connection module
101 Foundation connection segment
102 Foundation connection module
103 Foundation connection segment
104 Foundation connection module
105 Foundation connection segment
106 Top module
108 Bolt hole
109 Bolt hole
111 Lowest module
112 Tower element
113 Bolt hole
114 Foundation segment tower element
115 Reinforcement plate
116 Bolt hole
117 Foundation plate
MM-01 Assembly method of modules with the same material thickness and cross-section
MM-02 Assembly method of modules with different material thicknesses and same cross-sections
MM-03 Assembly method of modules with the same material thickness but different cross-sections
MM-04 Assembly method of modules with different material thicknesses and cross-sections
MM-05 An alternative mounting method for modules with different material thicknesses

DETAILED DESCRIPTION OF THE
EMBODIMENTS

The general view of the tower (1) is shown in FIG. 1. The tower (1) is fixed to the ground (concrete foundation) with the foundation module (2). Lower module (5), middle module (6) and upper module (8) are assembled on the base module (2), respectively. The lower module has an entrance door (3) and reinforcement plates (4). The features of the lower, middle and upper modules (5, 6 and 8) will be explained in detail below. The lengths of the modules (5, 6 and 8) can be between 1 meter and 13 meters or more. The upper diameter and cross section of the foundation module (2) and the lower diameter and cross section of the lower module (5) are equal. Likewise, the ceiling diameter and cross-section of the lower module (5) and the base diameter and cross section of the middle module (6) are equal. This situation is the same for all overlapping modules. In the ceiling part of the upper module (8), there is a top flange (9) for nacelle mounting. The top flange (9) is mounted to the upper module with flange fasteners (10) made of steel material.

Following (005, 006, 007, 008, 009, sections 009A, 010, 010A, 011 and 012) describe the characteristics of ten different tower elements (11, 22, 25, 29, 30, 34, 38, 39, 40 and 45) to be used in the module sections that make up the tower. The drawings of these tower elements are shown in FIGS. 2, 3, 4, 5, 6, 7, 8 and 9. Modules can be built using one or more of these tower elements, in order to optimize tower design.

Figures 10, 10A, 10B, 10C, 10D, 10E, 10F:
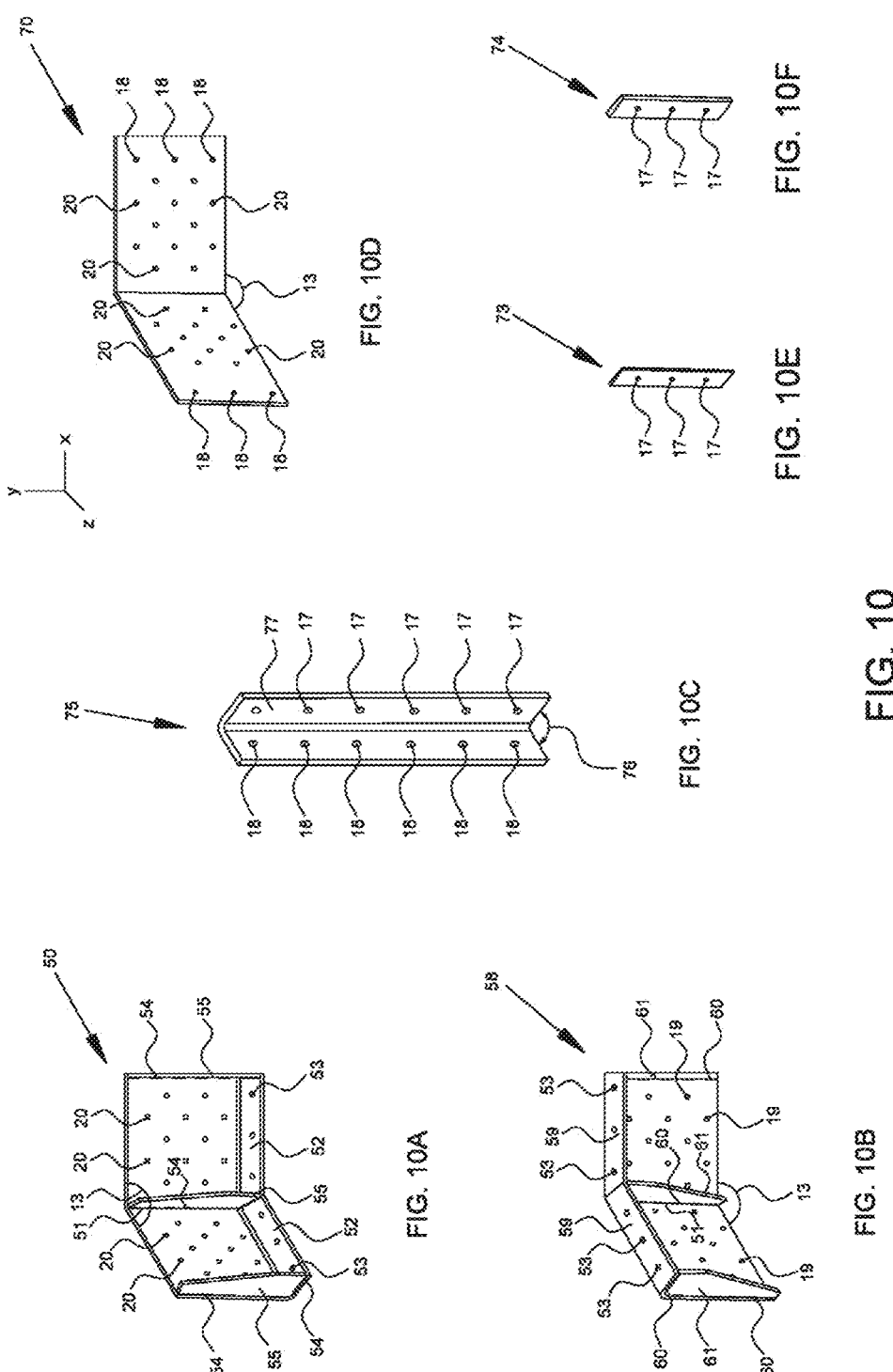
FIG. 10 Shows the module fittings

In the following sections (013, 014, 015, 016, 016A, 016B and 016C), the features of the assembly elements (50, 58, 70, 73, 74 and 75) to be used in the assembly of the modules to each other are explained. The drawings of these mounting elements are shown in FIG. 10.

The details of the modules that make up the tower are explained in the sections (018, 019, 020, 021, 022 and 023) below and in the A, B, C, D clauses. Drawings of these modules are shown in FIGS. 12, 13, 14, 14-1, 15, 15-1, 16, 16-1, 17 and 17-1.

In the following sections (024, 025, 25A, 26 and 026A), the methods of assembling modules together (MM-01, MM-02, MM-03, MM-04, MMO-5) are explained, and the drawings in FIGS. 18, 19-1, 19-2, 20 and 20-1 are shown.

The basic connection module is explained in the following sections (027, 028, 029 and 030), and the drawings are shown in FIG. 21.

The top flange is explained in the section (031) below, and its drawings are shown in FIG. 22.

The entrance door and reinforcement plate are explained in the following sections (032 and 033), and their drawings are shown in FIGS. 23 and 24.

Figure 11:
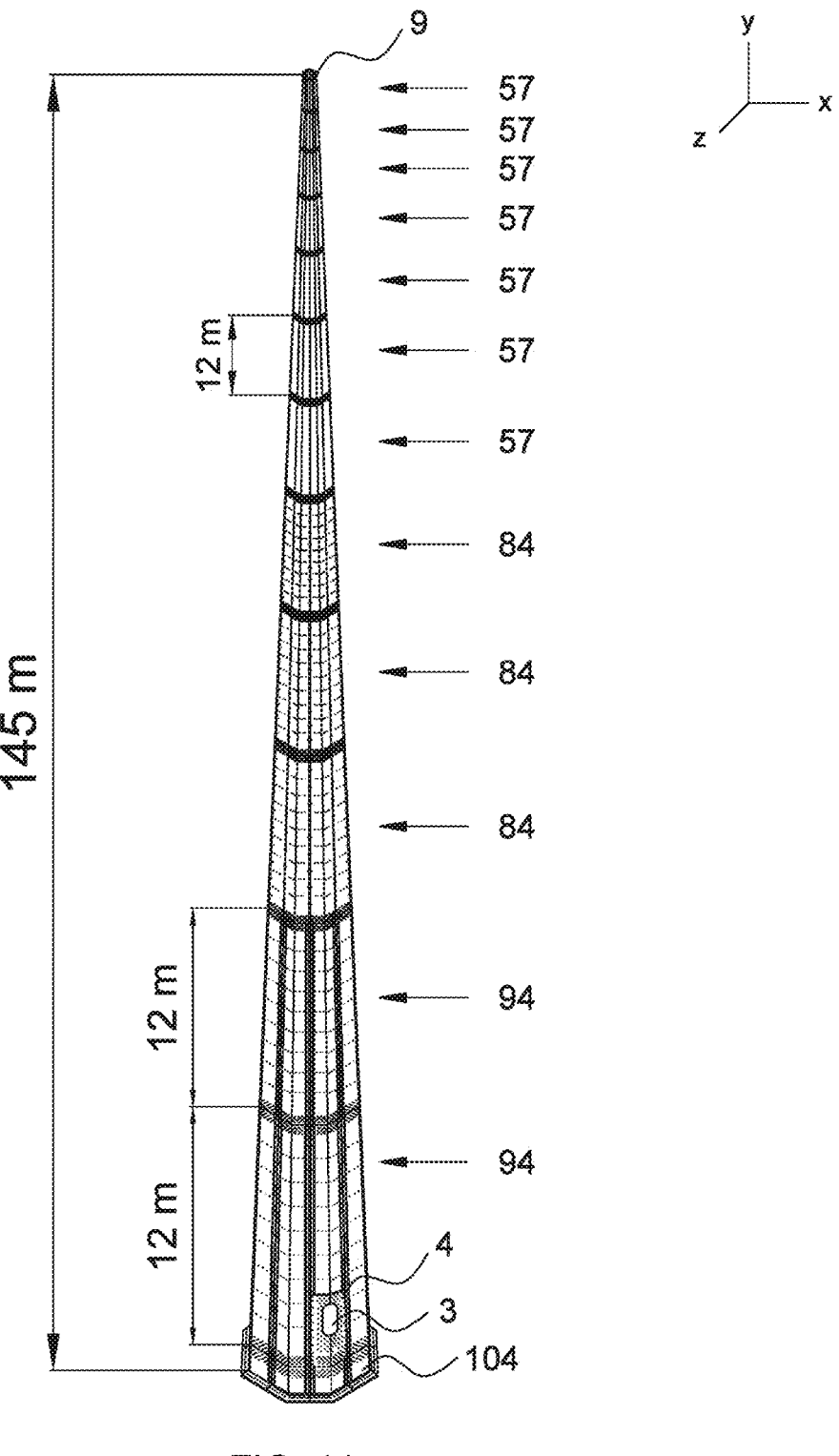
FIG. 11 Shows a sample tower view at 145 m height.

In the following section (034), different module selections and tower construction methods are explained for tower optimization, and their drawings are shown in FIG. 25. An example tower view with a height of 145 meters is shown in FIG. 11.

Figures 1, 1A, 1B, 1C, 19:
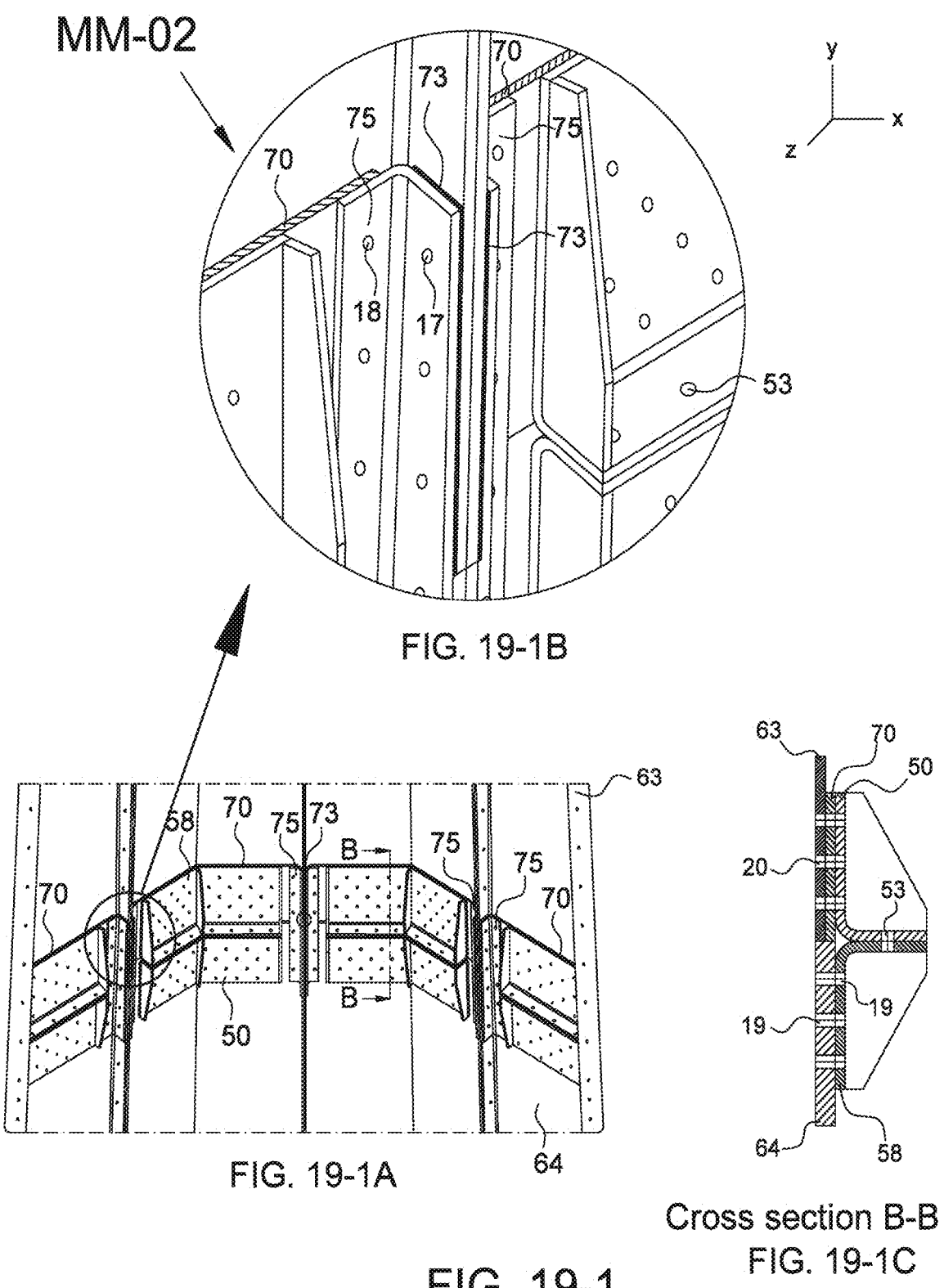
Figures 2, 2A, 2B, 2C, 19:
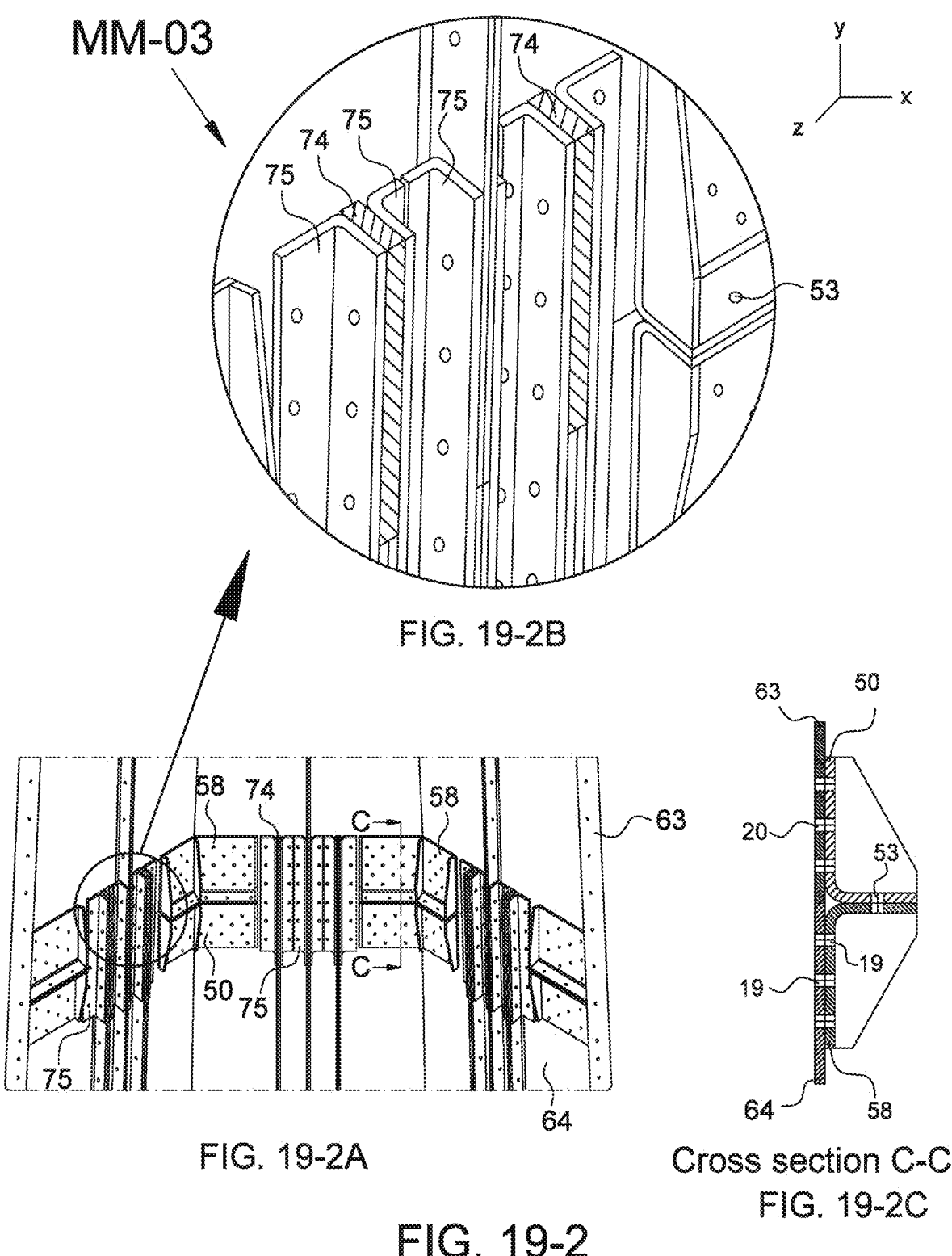

FIG. 2 shows the section and perspective views of a single-walled tower element (11). The cross section of the tower element (11) is shown in FIG. 2A. In FIGS. 2A, B, and C, there is a bending line (12) in the longitudinal direction of the part with the angle (13) depending on the number of sides of the equilateral polygon forming the module section. On both sides of the section, there are flanges (14) bent along the tower element with an angle of 90 degrees (15), and bolt holes (16) on the flanges to be combined with other tower elements to form the module. There are bolt holes (17 and 18) for mounting the modules to be placed on top of each other and bolt holes (19 and 20) for mounting the module connection parts to each other in the lower and upper parts of the tower element. There may be other holes on the flange for mounting other accessories (ladder, platform, cable carriers, lighting fixtures, etc.) as required. The flanges are symmetrical with respect to the bending line (12) in the middle of the tower element (11). The material of this tower element 11 can be steel or composite material. The length of the tower element can be between 1 meter and 13 meters.

FIG. 3 shows the cross-sectional and perspective views of the outer wall (22) of a one-piece and multi-walled tower element. This tower element (22) has the same structure as the tower element (11) described above in section (005), with the difference that it has bolt holes (21 and 23) for mounting the inner wall. The material of this tower member (22) can be steel or composite material.

FIG. 4 shows the section and perspective views of a single-walled U-shaped tower element (25). The part is in U form. there are flanges (26) bent along the tower element with a 90 degree angle (15), bolt holes (16) on the flanges to be combined with other tower elements to form the module, and bolt holes (17 and 18) for mounting the modules to each other. The bolt holes in the flanges correspond exactly with the bolt holes in the flanges of the parts (11 and 22) described in sections (005 and 006) above. The flanges are symmetrical with respect to the axis 28 in the middle of the part. The material of this part (25) can be steel or composite material.

FIG. 5 shows the cross-sectional and perspective views of the outer wall (29) of a multi-walled U-shaped tower element. This part has the same structure as the part described in the section numbered (007) above, with the difference that it has bolt holes (23) for mounting the inner wall. The material of this part 29 can be steel or composite material.

Perspective views of a tower element (30) to be used as the inner wall middle part in a multi-walled section are shown in FIGS. 6B and 6C, and its V-shaped section is shown in FIG. 6A. In the middle of the part (30) there is a bending line (31) bent in the longitudinal direction and the bending angle (32) is the same as the bending angle (13) of the segment (11) in FIG. 2A described above in section (005). In this way, the inner wall middle part fits perfectly into the outer wall. The width 33 of the part 30 may be up to the beginning of the radius of the flange on the outer wall to which it will be fixed. There are bolt holes (21 and 23) for fixing the inner wall middle part (30) to the outer wall, and bolt holes (18, 19 and 20) for mounting the modules to each other. These holes (18, 19, 20, 21 and 23) are the same as the holes (18, 19, 20, 21 and 23) on a multi-walled tower element (22) described above in section (006) and exactly meet each other. The length (A) of the part (30) is the same as the length of the outer wall to which it will be installed. This part 30 can be single or multi-walled. The material of this part 30 can be steel or composite material. When it is made of composite material, it reduces the weight of the tower and increases the natural frequency of the tower.

In FIGS. 6D and 6E, cross-sectional and perspective views of an alternative tower element (38) to be used as the inner wall middle part in a multi-walled section are shown. The difference of this part (38) from the tower element (30) in the section numbered (009) above is that it does not have bolt holes (18, 19 and 20) and its length (B) is compared to the length (A) of the tower element (30) in the section (009) above.) is shorter. This part 38 can be single or multi-walled. The material of this part 38 can be steel or composite material. When it is made of composite material, it reduces the weight of the tower and increases the natural frequency of the tower.

In FIGS. 7B and C, the cross-section and perspective views of a tower element (34) to be used as the inner wall middle part, and the section of the inner wall middle part

(34) whose section is V-shaped in FIG. 7A. This part (34) has the same structure as the part (30) described above in the section (009), the difference is that its width (35) is narrower and that there are no bolt holes (23) on the sides. The length (C) of the part (34) is the same as the length of the outer wall to which it will be installed. This piece can be single or multiwalled. The material of this part 34 can be steel or composite material. When it is made of composite material, it reduces the weight of the tower and increases the natural frequency of the tower.

FIGS. 7D and E show the cross-sectional and perspective views of a tower element (39) to be used as the inner wall middle part. The difference of this part (39) from the tower element (34) in the section (010) above is that it does not have bolt holes (18, 19 and 20) and its length (D) is compared to the length (C) of the part (34) in the section numbered (010) above, it is shorter. This part 39 can be single or multi-walled. The material of this part 38 can be steel or composite material. When it is made of composite material, it reduces the weight of the tower and increases the natural frequency of the tower.

Figures 8, 8A, 8B, 8C, 8D, 8E, 9, 9A, 9B, 9C:
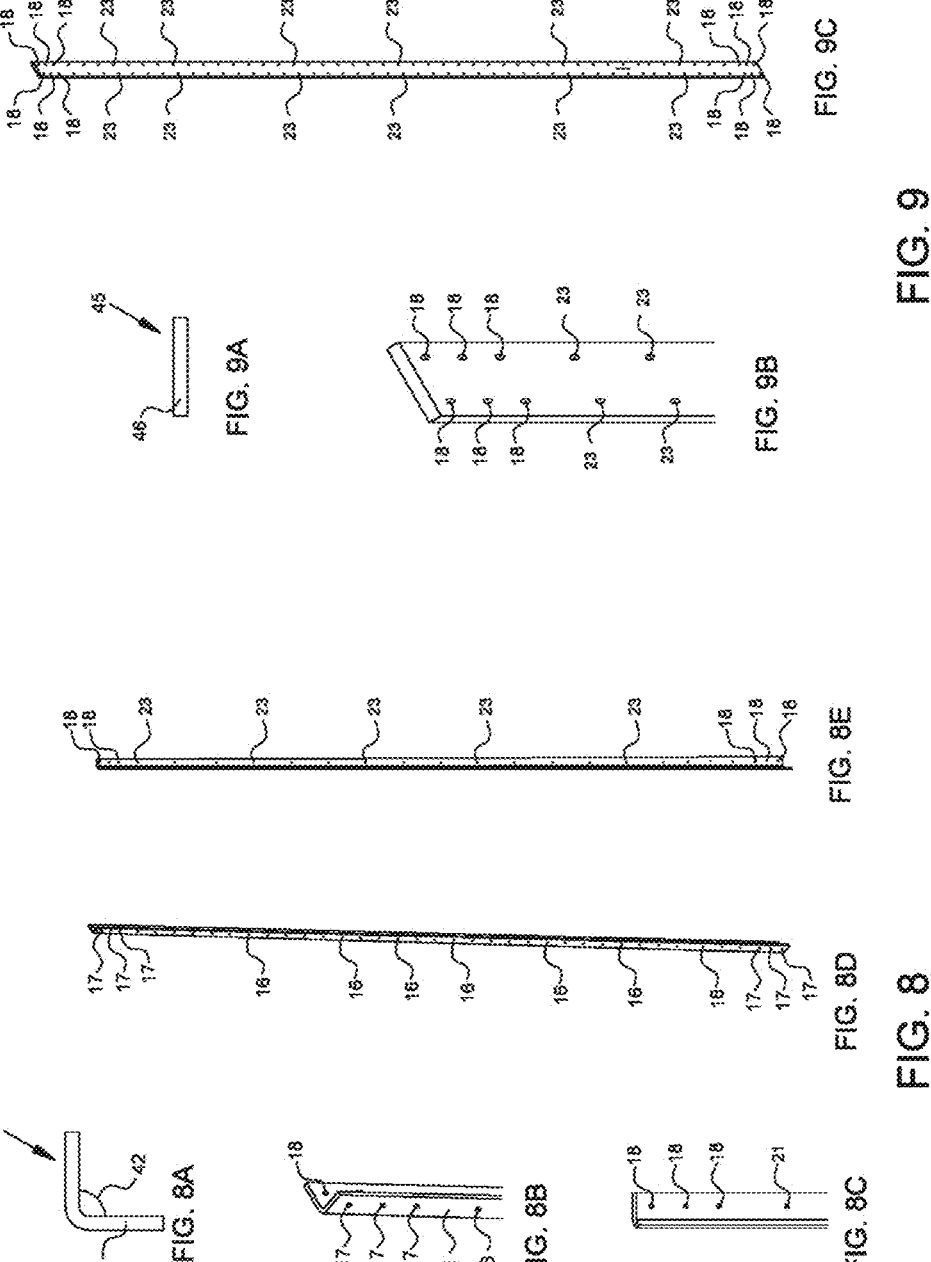
FIG. 8 The inner wall L piece shows the tower element
FIG. 9 Shows the inner wall tower element

FIG. 8 shows the section and perspective views of the inner wall L piece (40) to be used in a multi-walled section. Part 40 is L-shaped. It has a bent flange (41) at a 90 degree angle (42). On the flanges (41) there are bolt holes (16) for mounting with other segments and bolt holes (17) for mounting the modules to each other, on the other side of the L part there are bolt holes (23) for mounting to the outer wall and bolt holes (18) for mounting the modules to each other. This part 40 can be used as an inner wall in the tower members described in sections (005, 006, 007 and 008) above. This part (40) is used as two parts produced symmetrically to each other in each tower element. This piece can be single or multi-walled. The material of this part (40) can be steel or composite material. When it is made of composite material, it reduces the weight of the tower and increases the natural frequency of the tower.

In FIG. 9, there is a flat plate-shaped part (45) designed to be used as an alternative interior wall in the multi-wall tower elements described above in sections (007 and 008). The section of the piece (46) is in the form of a rectangle as seen in FIG. 9A. There are bolt holes (23) for mounting on the outer wall and bolt holes (18) for mounting the modules to each other on the part (45). This piece can be single or multi-walled. The material of this part 45 can be steel or composite material. When it is made of composite material, it reduces the weight of the tower and increases the natural frequency of the tower.

In order to assemble the modules to each other, six different types of module connection elements are used. The properties of these elements are described below in sections (014), (015), (016), (16A), (16B) and (16C).

FIG. 10A has a perspective view of the module lower edge connection piece (50). There is a bend line (51) in the middle of the part. The bending angle (13) is the same as the angle (13) of the bend line (12) in the tower element (11) described in the section numbered (005) above and seen in FIG. 2A. In this way, the inner surface of the tower element and the outer surface of the lower edge connecting piece fit together perfectly. The bolt holes (20) on these surfaces fully meet the bolt holes (20) in the tower element (11). At the lower part of the part (50) there is a flange (52) bent at an angle of 90 degrees. The holes (53) on the flange correspond exactly to each other with the holes (53) on the flange (59) of the module upper edge connection (58) in the lower module shown in FIG. 10B. There are reinforcement plates

(55) fixed by welding (54) on both sides and in the middle of the lower edge connection piece (50). They provide mounting in x and y axes.

FIG. 10B has a perspective view of the module upper edge connection piece (58). There is a bend line (51) in the middle of the part. The bending angle is the same as the angle (13) of the bend line (12) in the tower element (11) described in the section numbered (005) above and seen in FIG. 2A. In this way, the inner surface of the tower element and the outer surface of the lower edge connecting piece fit together perfectly. The bolt holes (19) on these surfaces fully meet the bolt holes (19) in the tower element (11). At the top of part (58) there is flange (59) bent at an angle of 90°. The holes (53) on the flange correspond exactly to each other with the holes (53) on the flange (52) of the module lower edge connection (50) on the upper module. There are reinforcement plates (61) fixed by welding (60) on both sides and in the middle of the upper edge connection piece (58). They provide mounting in x and y axes.

The module connection L piece (75), which is a perspective view in FIG. 10C, has a flange (77) bent at a 90 degree angle (76). The bolt holes (17) on the flange (77) fully meet the bolt holes (17) in the flanges of the other tower elements, and the holes (18) on the other surface fully meet the holes (18) in the tower elements. Upper and lower modules are assembled from these holes with bolts. For each flange connection in the module section, two module connection L pieces (75) are mounted using. They provide mounting in x and z axes.

FIG. 10D shows the perspective view of the reinforcement plate (70) used between the lower edge connection piece (50) and the tower element where the connection piece (50) will be mounted at the base of the upper module, in case the thickness of the tower elements in the upper and lower modules is different. There is a bend line (51) in the middle part of the part, and the bending angle (13) is the same as the angle (13) of the bend line (12) in the tower element (11) described above in section (005) and shown in FIG. 2A. In this way, the inner surface of the tower element and the outer surface of the lower edge connecting piece fit together perfectly. The thickness of the reinforcement plate (70) is equal to the difference between the material thicknesses of the lower and upper modules. The bolt holes (20) of the module lower edge connection part (50) and the bolt holes (20) on the tower element (11) and the other bolt holes (18) on the tower element (11), the bolt holes (18) on the tower element (11) meets exactly.

FIG. 10E shows a perspective view of the reinforcement plate (73) used between the module connection L piece (75) at the base of the upper module and the module flange where it will be mounted, in case the thickness of the tower elements in the upper and lower modules is different. The thickness of the reinforcement plate (73) is equal to the difference between the material thicknesses of the lower and upper modules. It is assembled through the bolt holes (17). They provide mounting in the z axis.

If the lower module is multi-piece and the upper module is one piece, the reinforcement plate (74) is used. In FIG. 10F, there is a perspective view of the reinforcement plate (74). The module connection L piece (75) is used to complete the gap between the module connection L pieces (75) in the area of the upper module without flange. The thickness of the reinforcement plate 74 is twice the difference in material thicknesses of the lower and upper modules. It is assembled through the bolt holes (17). They provide mounting in the z axis.

In FIGS. 12, 13, 14, 14-1, 15, 15-1, 16, 16-1, 17 and 17-1, there are section, perspective and assembly pictures of ten different modules to be used in the tower. Each of these modules is constructed using one or more of the tower elements described in sections above (005, 006, 007, 008, 009, 009A, 010, 010A, 011, 012). The details of these modules will be explained in sections 18, 19, 20, 21, 22 and 23 below and in sub-clauses A, B, C, D.

Figures 12, 12A, 12B, 12C, 12D, 12E, 12F, 12G, 12H:
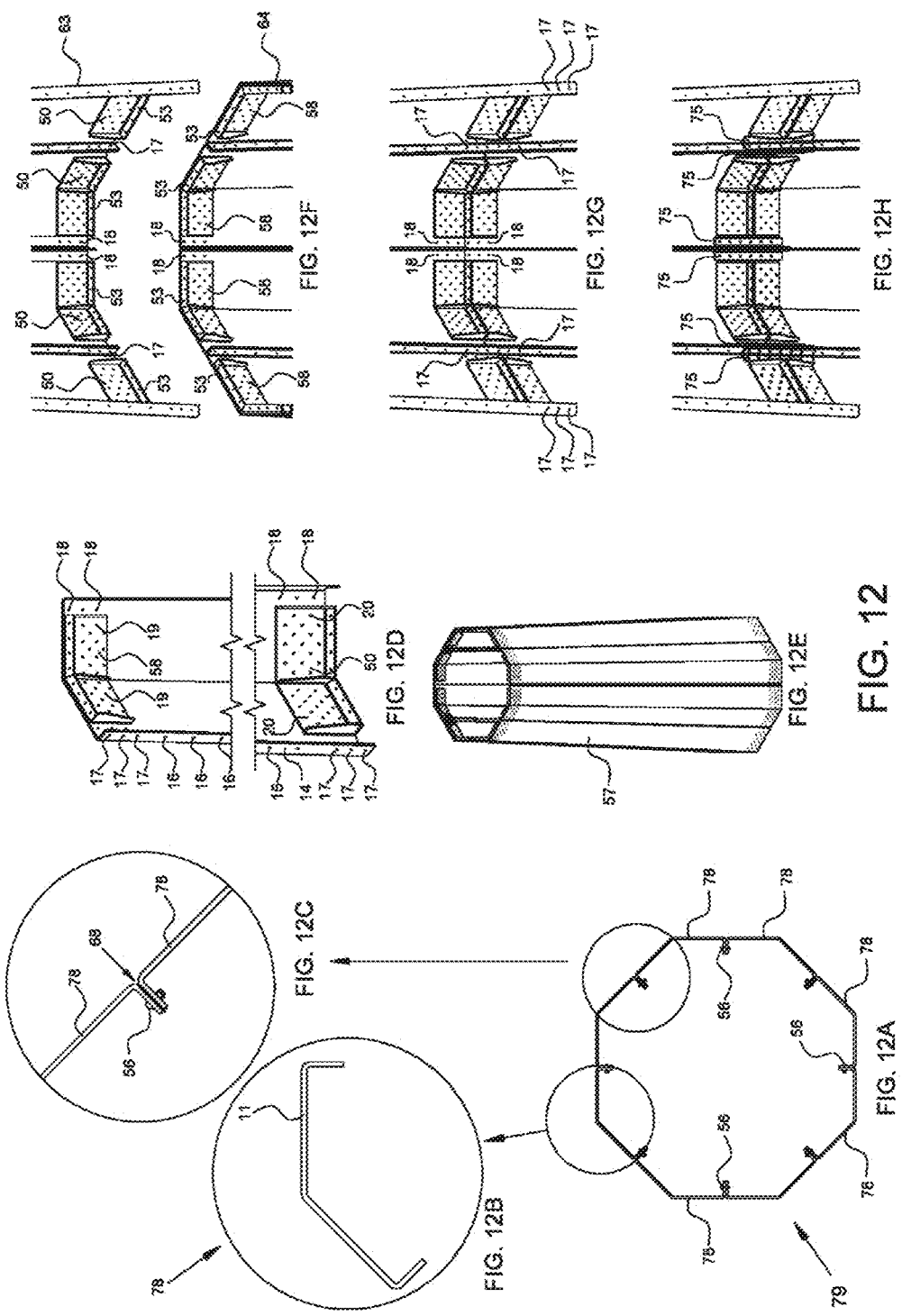
FIG. 12 Shows a tower module with segments of one piece and one wall

In FIG. 12, there are cross-sectional and perspective views of the module (57) whose cross section is an eight-sided polygon and each segment (78) is one piece and single walled. In each segment (79) of this module, the tower element (11) described above in section (005) is used. There is the section of the module (79) in FIG. 12A and the section of the segment (78) in FIG. 12B.

The lower and upper module connection parts (50 and 58), which are explained in detail in sections (014) and (015) above, are mounted on the segment (78) whose production has been completed. Mounting details are shown in FIG. 12D. In the bolt holes (19) on the upper part of the tower element (78) forming the segment shown in FIG. 2, the module upper edge connection part (58) is mounted to each other with bolts through the bolt holes (19). The numbers of the bolt holes (19) on both parts are the same and all the holes correspond exactly to each other. In the bolt holes (20) at the bottom of the segment, the module lower edge connection piece (50) is mounted to each other with bolts through the bolt holes (20). The numbers of the bolt holes (20) on both parts are the same and all the holes correspond exactly to each other. Finally, other accessories (stairs, platforms, cable carriers, lighting fixtures, elevator elements, etc.) are assembled and the segments (78) are shipped to the area where the wind power plant will be installed.

The segments coming to the switchboard area (78) are mounted to each other with bolts (56) through the holes (16) in the flanges as shown in FIGS. 12A, C, D and E, and the single-walled module (57) is assembled. Liquid or solid sealing materials may be used between segment flanges 68 to seal. (FIG. 12C).

The assembly of the modules to each other is shown in FIGS. 12F, G and H, cut lengthwise from the middle axis. In FIG. 12F, the upper module (63) to be mounted on the lower module (64) is overlapped in such a way that its axes coincide exactly. The bottom section of the upper module (63) and the ceiling section of the lower module (64) are exactly equal to each other, and they fit (overlap) on the butt. Thanks to this feature, it is ensured that the loads on the tower are distributed to the foundation by being distributed evenly and homogeneously throughout the cross section. As shown in FIG. 12G, the bolt holes (53) on the flange of the bottom module connection parts (50) in the upper module (63) when modules (63 and 64) are placed on top of each other exactly meet the bolt holes (53) on the flange of the upper module connection parts (58) in the lower module (64). The modules are mounted together with bolts through these holes (53). This process is the assembly step of the modules on the horizontal axis. Then, as shown in FIG. 12H, the module connection L pieces (75) are fixed with bolts through the holes (17 and 18) in the flanges on the modules, one on the right and left of each flange, and the assembly of the modules is completed. Here, 2 module connection L pieces (75) are used, 1 on the right and left sides for each segment. This process is the assembly step of the modules on the vertical axis. With this mounting method, a rigid and safe connection is provided thanks to the module fasteners used in both horizontal and vertical axis in the connection areas of the modules.

In FIG. 13, there are cross-section and perspective views of the module (65) whose cross section is an eight-sided polygon and each segment (80) is multi-part and single-walled. The segments (80) of this module consist of one outer wall middle part (11) and two U-shaped side parts (25). The section of the module (81) is shown in FIG. 13A, and the section of the segment (80) is shown in FIG. 13B.

For the assembly of the segment, the U-shaped side parts (25) are fixed on both sides of the tower element (11) with bolts (62) through the holes (16) in their flanges (FIG. 13B). Next, the lower and upper module fittings (50 and 58) are assembled as shown in FIG. 13D. The assembly details of these parts are the same as the method described in section (018A) above. Finally, other accessories (stairs, platforms, cable carriers, lighting fixtures, elevator elements, etc.) are assembled and the segments (80) are shipped to the area where the wind farm will be installed.

The segments coming to the switchboard area (80) are mounted to each other with bolts (56) through the holes (16) in the flanges as shown in FIGS. 13C, D and E, and the single-walled module (65) is assembled. Liquid or solid sealants can be used between the flanges (68) of the segments to seal. (FIG. 13C).

The assembly of the modules to each other is shown in FIGS. 13F, G and H, cut longitudinally from the middle axis. The mounting method is exactly the same as described in section (018C) above. Six module connection L pieces (75) are used, with the only difference being three on the right and left sides for each segment. With this mounting method, a rigid and safe connection is provided thanks to the module fasteners used in both horizontal and vertical axis in the connection areas of the modules.

Figures 1, 1A, 1B, 1C, 14:
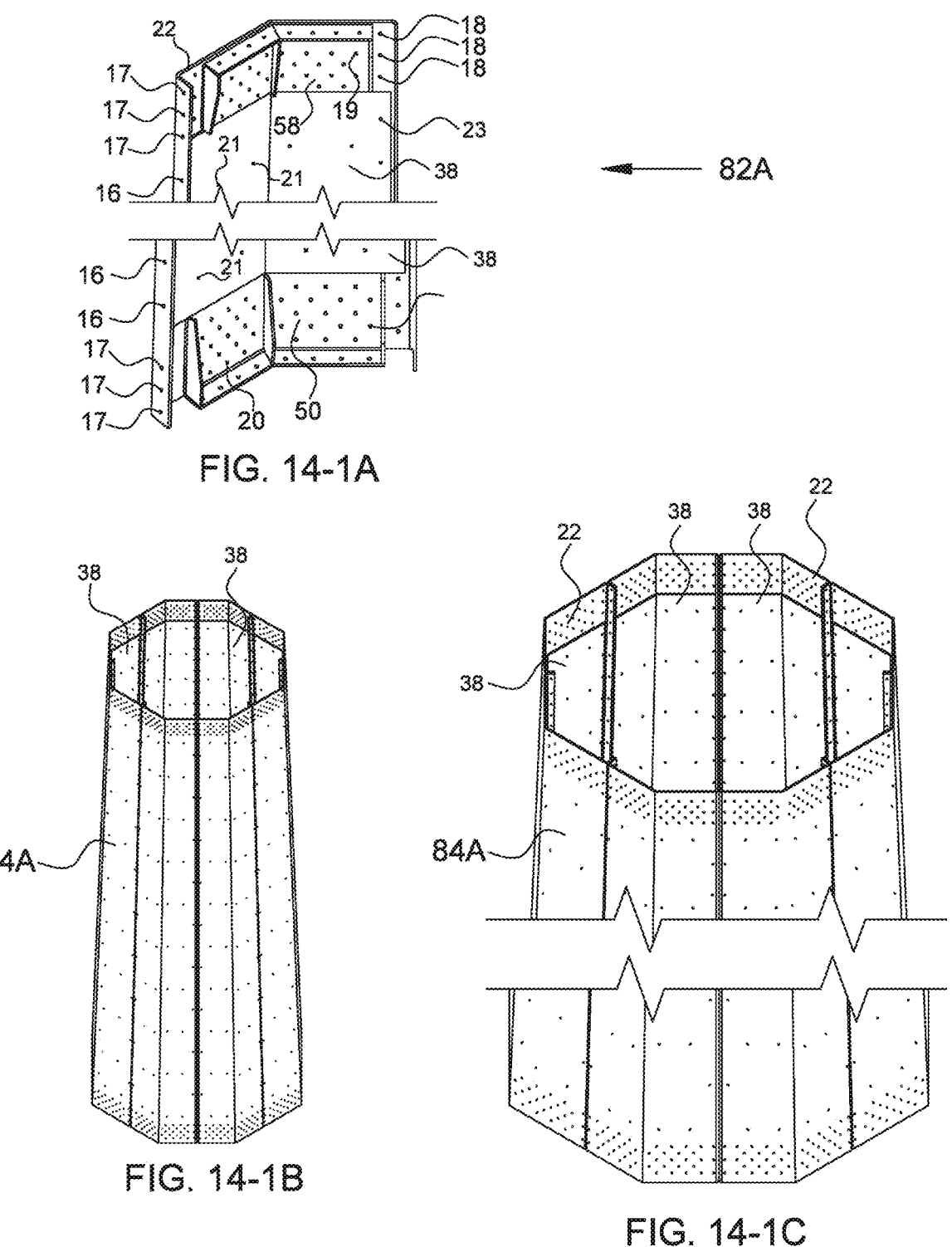
FIG. 14 Shows a tower module with segments of one piece and multiple walls

In FIG. 14, there are cross-sectional and perspective views of the module (84) whose cross section is an eight-sided polygon and each segment (82) is one piece and multi-walled. The segments (82) of this module (84) consist of outer wall (22) and inner wall (30). The section of the module (83) is shown in FIG. 14A and the section of the segment (82) in FIG. 14B.

The inner wall (30) is fixed to the outer wall (22) with bolts (37) through the holes (21 and 23) on both parts that meet each other exactly. (FIG. 14B, C). Here, the width (33) of the inner wall (30) can be up to the radius beginning of the flange on the outer wall (22) to which it will be fixed, as seen in the detail (36) in FIG. 14C. Next, the lower and upper module fittings (50 and 58) are assembled as shown in FIG. 14D. The assembly details of these parts are the same as the method described in section (018A) above. Finally, other accessories (stairs, platforms, cable carriers, lighting fixtures, elevator elements, etc.) are assembled and the segments (82) are shipped to the area where the wind farm will be installed.

The segments (84) coming to the plant area are assembled to each other with bolts (56) through the holes (16) in the flanges as shown in FIGS. 14C, D and E, and the multi-walled module (84) is assembled. Liquid or solid sealing materials may be used between the flanges 36 of the segments to seal. (FIG. 14C)

The assembly of the modules to each other is shown in FIGS. 14F, G and H, cut longitudinally from the middle axis. In FIG. 14F, the upper module (63), which will be mounted on the lower module (64), is placed on top of each other so that the axes are fully met. The bottom section of the upper module (63) and the ceiling section of the lower module (64) are exactly equal to each other. Thanks to this feature, it is ensured that the loads on the tower are distributed to the foundation by being distributed evenly and homogeneously along the cross-section in the vertical axis direction. As seen in FIG. 14G, when the modules (63 and 64) are placed on top of each other, the bolt holes (53) in the module lower side connection part on the upper module (63), the bolt holes (53) of the module upper side connection part (58) in the lower module (64) meets exactly. The modules are mounted together with bolts through these holes (53). This process is the assembly step of the modules on the horizontal axis. Then, as shown in FIG. 14H, the module connection L parts (75) are fixed with bolts through the holes (17 and 18) in the flanges on the modules, one on the right and left of each flange, and the assembly of the modules is completed. Here, two module connection L pieces (75) are used, one for each segment on the right and left. This process is the assembly step of the modules on the vertical axis. With this mounting method, a rigid and safe connection is provided thanks to the module fasteners used in both horizontal and vertical axis in the connection areas of the modules.

In FIG. 14-1, the only difference from the module (84) described above (020, 020A, 020B and 020C) is the perspective views of the module (84A), which is made using the tower element (38) instead of the tower element (30) as the inner wall. The inner wall tower element (38) is fixed to the outer wall (22) by bolts through holes (21) located above both parts and meeting each other exactly. The perspective view of the segment (82A) is shown in FIG. 14-1 A. Apart from this, everything is the same as the descriptions described above (020, 020A, 020B and 020C).

Figures 1, 1A, 1B, 1C, 15:
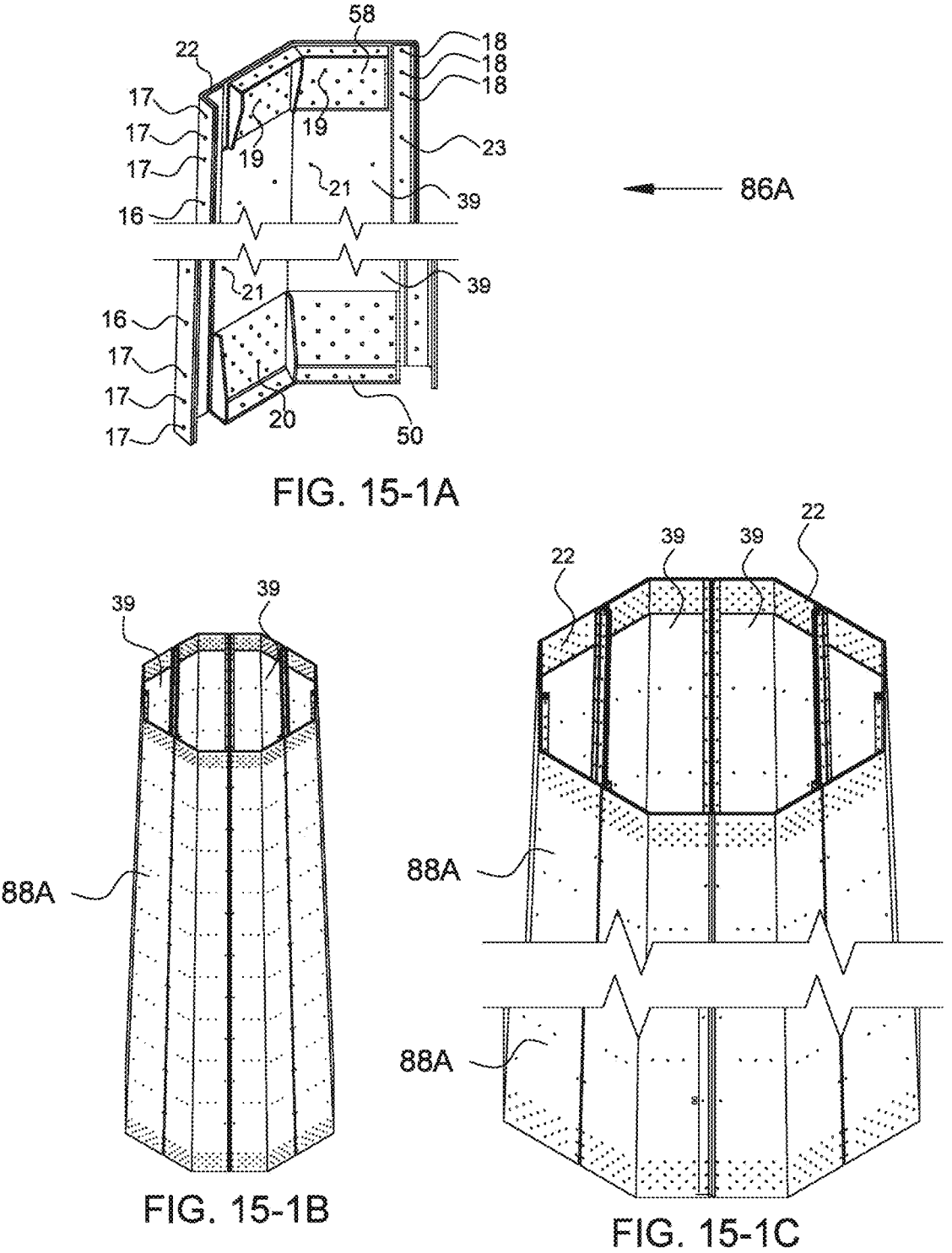
FIG. 15 Shows a tower module with segments of one piece and multiple walls

In FIG. 15, there are cross-sectional and perspective views of the module (88) whose cross section is an eight-sided polygon and each segment is one piece and multi-walled. The segments (86) of this module are composed of outer wall (22), inner wall middle part (34) and two inner wall L parts (40). The section of the module (85) is shown in FIG. 15A in FIG. 15A, and the section of the segment (86) in FIG. 15B.

The section of the segment (86) is shown in FIG. 15B. The inner wall middle part (34) is fixed to the outer wall (22) with bolts (37) through the holes (21) located on both parts and meeting each other exactly. The inner wall L pieces (40) are also fixed to the outer wall (22) with bolts (37) through the holes (23) (FIG. 15B, C, D) located on both parts and meeting each other exactly. Here, the width (35) of the inner wall (34) can be up to the inner wall L piece as seen in the detail (87) in FIG. 15C. Next, the lower and upper module fittings (50 and 58) are assembled as shown in FIG. 15D. The assembly details of these parts are the same as the method described in section (018A) above. Finally, other accessories (stairs, platforms, cable carriers, lighting fixtures, elevator elements, etc.) are assembled and the segments (85) are shipped to the area where the wind farm will be installed.

The segments coming to the power plant area (86) are mounted to each other with bolts (56) through the holes (16) in the flanges as shown in FIGS. 15C, D and E, and the multi-walled module (88) is assembled. As described in section (018B) above, liquid or solid sealants can be used between flanges of the segments to seal.

The assembly of the modules to each other is shown in FIGS. 15F, G and H, cut longitudinally from the middle axis. The mounting method is exactly the same as that described in section (020C) above. Here, two module connection L pieces (75) are used, one for each segment on the right and left. With this mounting method, a rigid and safe connection is provided thanks to the module fasteners used in both horizontal and vertical axis in the connection areas of the modules.

In FIG. 15-1, the only difference from the module (88) described above (021, 021 A, 021 B and 021 C) is the perspective views of the module (88A), which is made using the tower element (39) instead of the tower element (34) as the inner wall. The inner wall tower element (39) is fixed to the outer wall (22) by bolts from holes (21) located above both parts and meeting each other exactly. The perspective view of the segment (86A) is shown in FIG. 15-1 A. Apart from this, everything is the same as the descriptions described above (021, 021 A, 021 B and 021 C).

Figures 1A, 1B, 1C, 16:
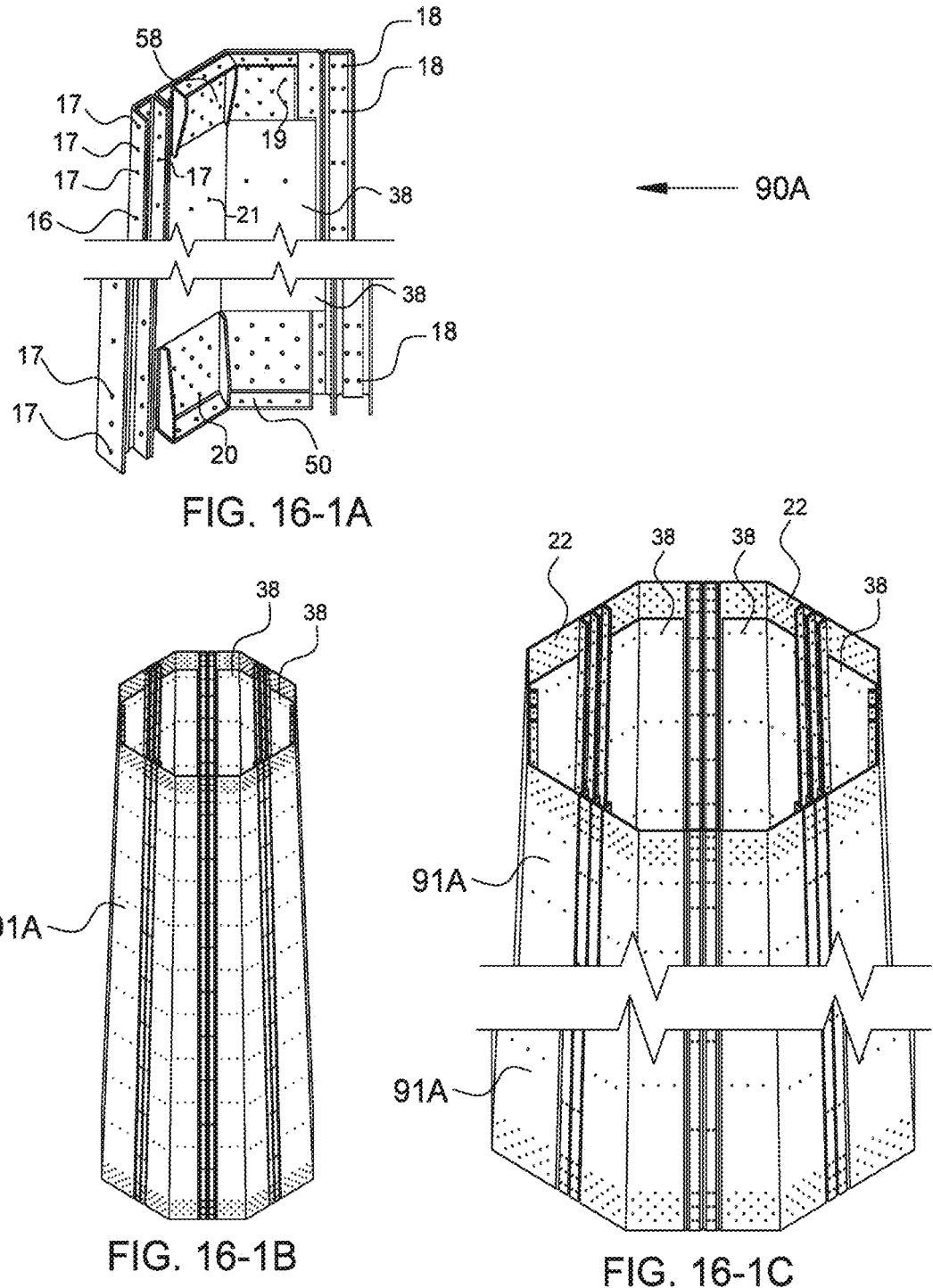
FIG. 16 Shows a tower module with segments with multiple parts and multiple walls FIG. 16-1 Shows a tower module with segments with multiple parts and multiple walls FIG. 17 Shows a tower module with segments with multiple parts and multiple walls FIG. 17-1 Shows a tower module with segments with multiple parts and multiple walls FIG. 18 Shows the mounting method (MM-01) of modules with the same material thicknesses and cross sections.

In FIG. 16, there are section and perspective views of the module (91) whose cross section is an eight-sided rhombus and each segment is multi-part and multi-walled. The segments (90) of this module are the U-shaped tower element (29) and the plate-shaped inner wall (45) attached to both sides of the segment (82) (FIG. 14B) described above in section (020). The segments of this module are composed of outer wall (22), outer wall in U form (29), inner wall middle part (30), inner wall parts in flat plate form (45).

As shown in FIGS. 16B, C, and D, the inner wall (30) is fixed to the outer wall (22) with bolts (37) through the holes (21 and 23) on both parts that meet each other exactly. Then, the flat plate-shaped inner wall parts (45) are fixed to the U-shaped outer walls (29) with bolts (37) through the holes (23) on both parts that meet each other exactly. As shown in FIGS. 16B, C and D, the U-shaped side parts (29) are fixed to the right and left sides of the outer wall middle part (22) with bolts (62) through the holes (16) in their flanges overlapping each other. Finally, other accessories (stairs, platforms, cable carriers, lighting fixtures, elevator elements, etc.) are assembled and the segments (90) are shipped to the area where the wind farm will be installed.

The segments coming to the switchboard area (89) are mounted to each other with bolts (56) through the holes (16) in the flanges as shown in FIGS. 16C, D and E, and the multi-walled module (91) is assembled. As described in section 019B above, liquid or solid sealants can be used between flanges 68 of the segments to seal. (FIG. 13C).

The assembly of the modules to each other is shown in FIGS. 16F, G and H, cut longitudinally from the middle axis. The mounting method is exactly the same as that described in section (020C) above. Here, six module connection L pieces (75) are used for each segment, three on the right and left. With this mounting method, a rigid and safe connection is provided thanks to the module fasteners used in both horizontal and vertical axis in the connection areas of the modules.

In FIG. 16-1, the only difference from the module (91) described above in (022, 022A, 022B and 022C) is that the module (91 A) made by using the tower element (38) instead of the tower element (30) as the inner wall, they have perspective views. The inner wall tower element (38) is fixed to the outer wall (22) with bolts through the holes (21) on both parts that meet each other exactly. The perspective view of the segment (90A) is shown in FIG. 16-1 A. Other than that, everything is the same as the descriptions described in (022, 022A, 022B and 022C) above.

Figures 1, 1A, 1B, 1C, 17:
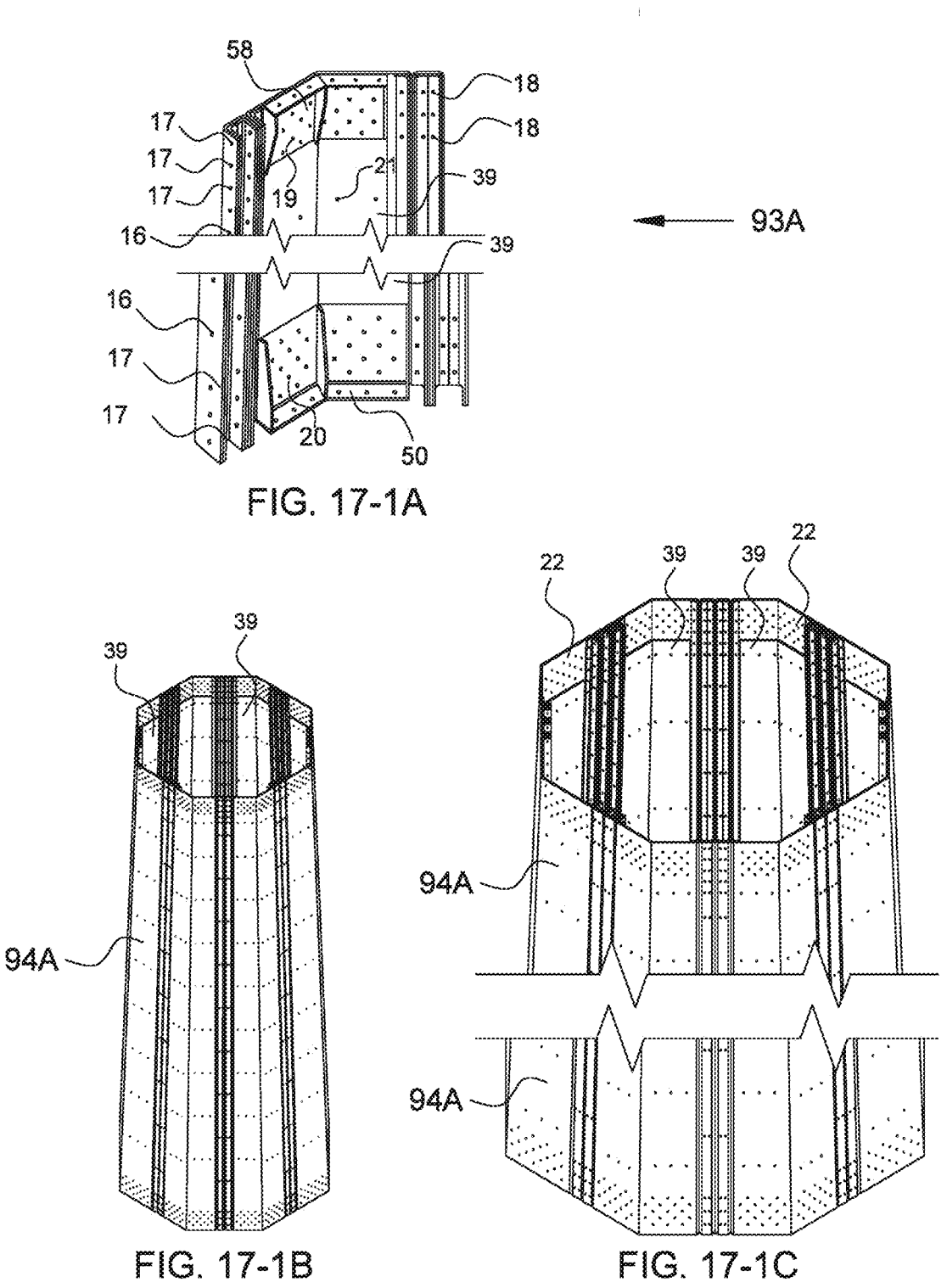

In FIG. 17, there are cross-section and perspective views of the module (94), whose cross section is an 8-sided rhombus and each segment is multi-part and multi-walled. The segments (93) of this module (94) are U-shaped outer walls (29) and inner walls (40) attached to both sides of the segment (82) (FIG. 15B) described above in section (021). The segments of this module consist of outer wall (22), two U-shaped outer skin (29), inner wall middle part (34), and four inner wall L pieces (40). The section of the module (92) is shown in FIG. 17A and the section of the segment (93) in FIG. 17B.

As shown in FIGS. 17B, C, and D, the inner wall middle part (34) is fixed to the outer wall (22) with bolts (37) through the holes (21) on both parts that meet each other exactly. The inner wall L parts (40) are fixed to the outer wall (29) with bolts (37) through the holes (23) on both parts that meet each other exactly. The lower and upper module connection pieces (50 and 58) are mounted to the outer wall (22) as shown in FIG. 17D. The assembly details of these parts are the same as the method described in section (018A) above. The U-shaped side parts (29) are fixed to the right and left sides of the outer wall middle part (22) with bolts (62) through the holes (16) in the flanges that overlap each other. Finally, other accessories (stairs, platforms, cable carriers, lighting fixtures, elevator elements, etc.) are assembled and the segments (93) are shipped to the area where the wind farm will be installed.

As seen in FIGS. 17A, C, D and E, the segments (93) coming to the central area are mounted to each other with bolts (56) through the holes in the flanges (16) and the multiwalled module (94) is assembled. As described in section 019B above, liquid or solid sealants can be used between flanges 68 of the segments to seal. (FIG. 13C) (023C) The assembly of the modules to each other is shown in FIGS. 17F, G and H, cut longitudinally from the middle axis. The mounting method is exactly the same as described in section (022C) above. Here, six module connection L pieces (75) are used for each segment, three on the right and left. With this mounting method, a rigid and safe connection is provided thanks to the module fasteners used in both horizontal and vertical axis in the connection areas of the modules.

In FIG. 17-1, the only difference from the module (94) described above (023, 023A, 023B and 023C) is the perspective views of the module (94A), which is made using the tower element (39) instead of the tower element (34) as the inner wall. The inner wall tower element (39) is fixed to the outer wall (22) by bolts from holes (21) located above both parts and meeting each other exactly. The perspective view of the segment (93A) is shown in FIG. 17-1 A. Apart from this, everything is the same as the descriptions described above (023, 023A, 023B and 023C).

Figures 18, 18A, 18B, 18C:
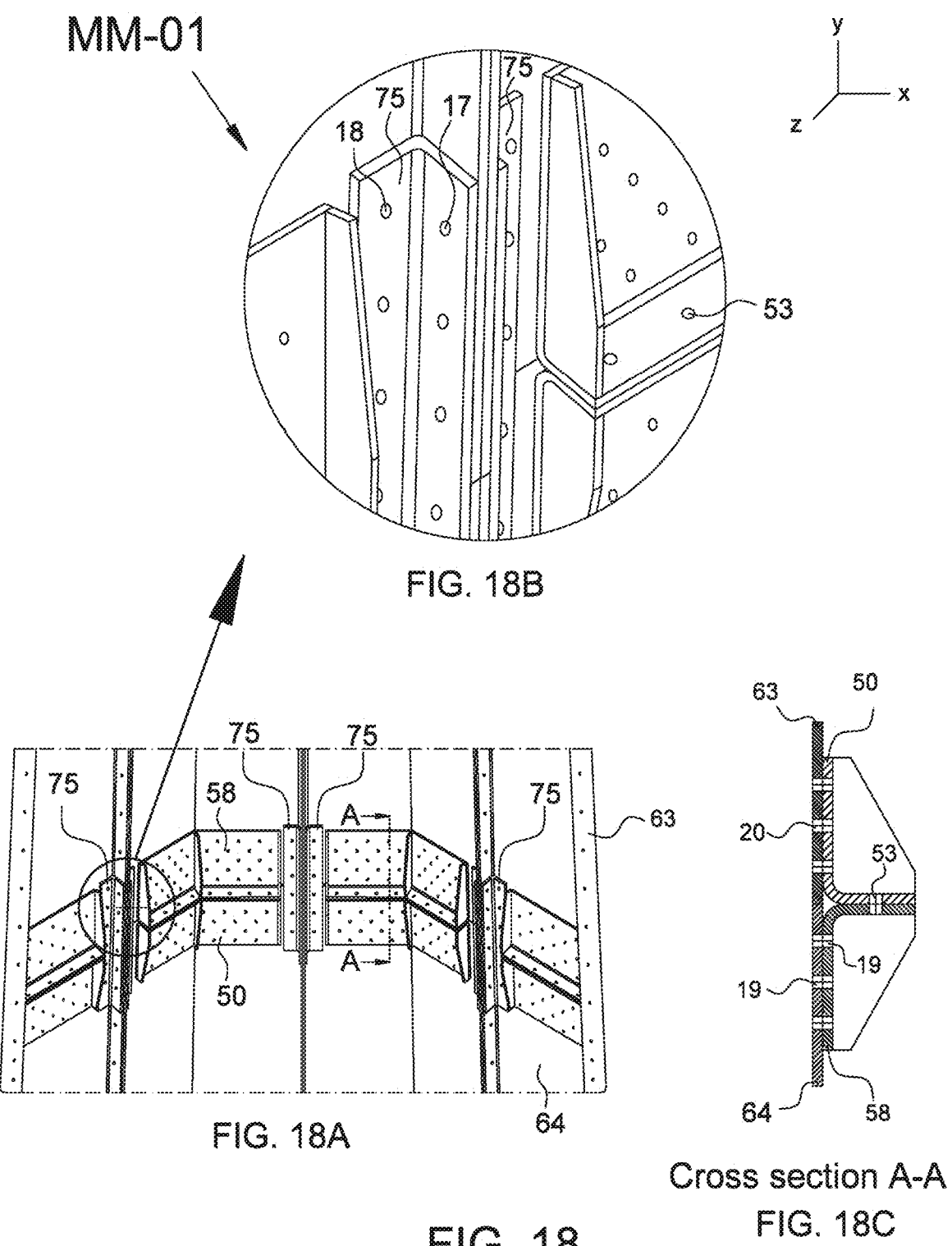

If the upper module (63) and the lower module (64) have the same material thickness and the same cross-section, the method of mounting the modules to each other (MM-01) is shown in FIG. 18. This method was explained in the above sections (18C, 19C, 20C, 21 C, 22C and 23C) for each module of different structure. The bottom section of the upper module (63) and the ceiling section of the lower module (64) are exactly equal to each other and they fit exactly on the butt. As an example of the general assembly method of this type of modules, the assembly view of the lower and upper modules, each segment of which is single piece and single wall, is shown in FIG. 18A with a longitudinal cut from the middle axis, and the enlarged view of the assembly area is shown in FIG. 18B. The assembly method is as described in section (18C) above. With this mounting method, a rigid and safe connection is provided thanks to the module fasteners used in both horizontal and vertical axis in the connection areas of the modules. The section view according to the A-A axis in FIG. 18A is shown in FIG. 18C.

If the upper module (63) and the lower module (64) have different material thicknesses and the cross sections are the same, the method of mounting the modules to each other (MM-02) is shown in FIG. 19-1. In this method, the outer perimeter of the bottom section of the upper module (63) and the outer perimeter of the ceiling section of the lower module (64) are made exactly equal to each other. Thus, when the modules (63 and 64) are placed on top of each other, no difference is seen when looking at the junction from the outside. The mounting of the modules to each other is shown in FIG. 19-1 A as cut lengthwise from the middle axis, and the enlarged view of the connection area is shown in FIG. 19-1 B. During the assembly, a reinforcement plate (70) is placed on the lower part of the module connection part (58) in the upper module (63) so that the bolt holes (53) in the module connection parts (50 and 58) fully meet each other. (An alternative mounting method in which the reinforcement plate (70) is not used will be described below in section (026A).) The thickness of the reinforcement plate (70) is equal to the difference between the material thicknesses of the lower and upper modules (63 and 64), and the bolt holes (20) on it fully meet each other with the bolt holes of the module lower edge connection piece (50). The reinforcement plate (70) is mounted in place at the factory during the assembly of the module lower edge connector (50) to the tower element of the upper module. In joining the flanges, an additional plate (73) is placed between each module connection L piece (75) and the flange on the upper module, which is explained above in section (16B). Thus, the material thickness differences between the upper and lower module are equalized. Apart from these details, the mounting method is exactly the same as described in sections (018C, 019C, 020C, 021 C, 022C and 023C) above. With this mounting method, a rigid and safe connection is provided in the connection areas of the modules, thanks to the module connection elements used. The section view according to the B-B axis in FIG. 19-1 A is shown in FIG. 19-1 C.

If the upper module (63) and the lower module (64) have the same material thicknesses and different cross-sections, the method of mounting the modules to each other (MM-03) is shown in FIG. 19-2. In this method, the outer perimeter of the bottom section of the upper module (63) and the outer perimeter of the ceiling section of the lower module (64) are made exactly equal to each other. Thus, when the modules (63 and 64) are placed on top of each other, no difference is seen when looking at the junction from the outside. The mounting of the modules to each other is shown in FIG. 19-2A with a longitudinal cut from the middle axis, and the enlarged view of the connection area is shown in FIG. 19-2B. The mounting method is exactly the same as the method described in section (24) above, except that the additional connection piece (74) described above in section (16C) is used between the module connection L pieces (75) in the upper module (63) where there is no flange. With this mounting method, a rigid and safe connection is provided in the connection areas of the modules, thanks to the module connection elements used. The section view according to the C-C axis in FIG. 19-2A is shown in FIG. 19-2C.

Figures 20A, 20B, 20C:
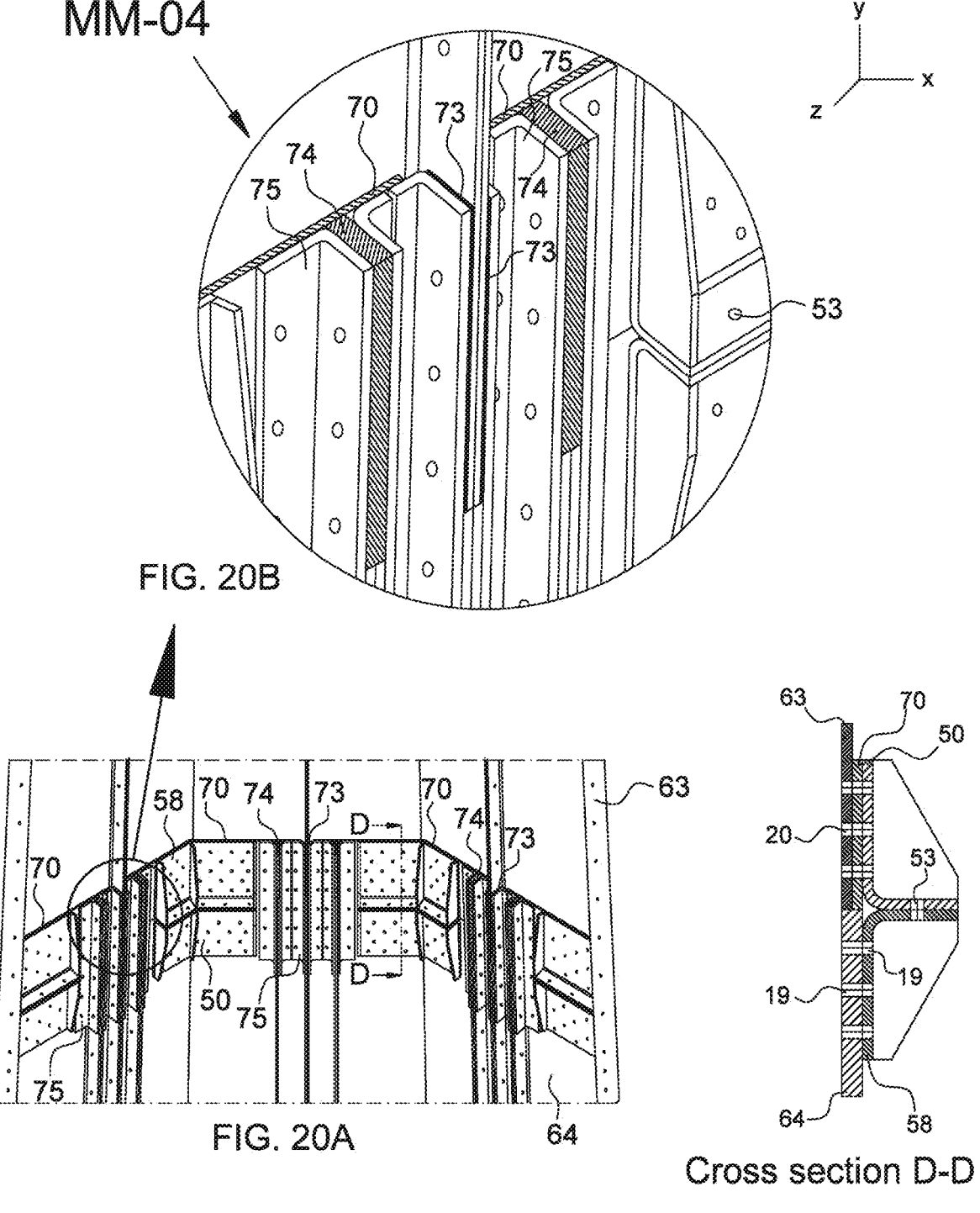
Figures 1, 1A, 1B, 1C, 20:
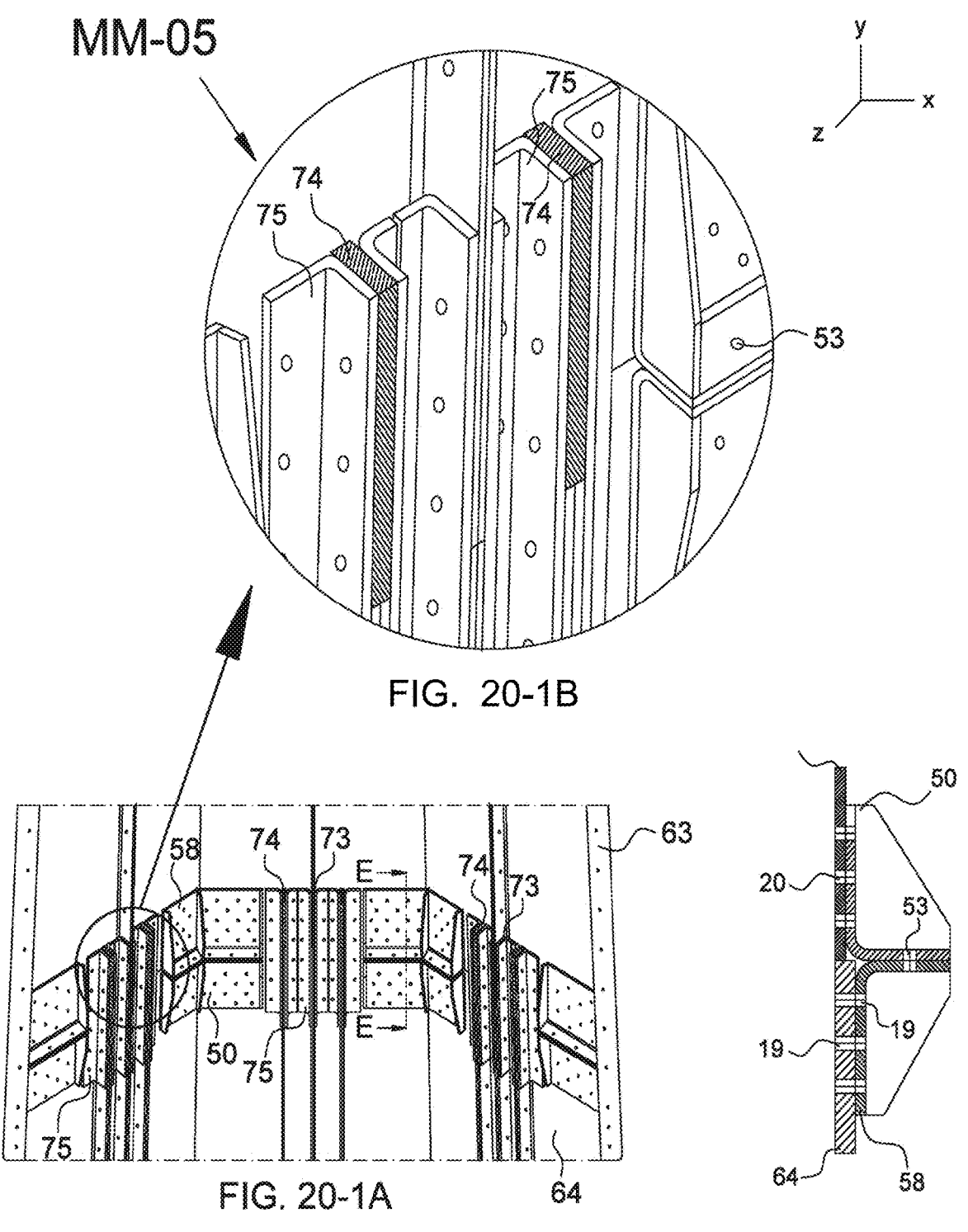

In case the upper module (63) and lower module (64) have different material thicknesses and different cross-sections, the method of mounting the modules to each other (MM-04) is shown in FIG. 20. In this method, the outer perimeter of the bottom section of the upper module (63) and the outer perimeter of the ceiling section of the lower module (64) are made exactly equal to each other. Thus, when the modules 63 and 64 are placed on top of each other, no difference is seen when looking at the junction from the outside. If the upper module (63) segments are single-piece and the lower module (64) segments are multipiece, the assembly of the modules to each other is shown in FIG. 20A, cut longitudinally from the middle axis. In addition, an enlarged image of the assembly region is shown in FIG. 20B. The mounting method is exactly the same as the method described in Section (25) above, and the difference is that in the upper module (63) in areas without flanges, the module connection is the use of an additional connection part (74) described in Section (16C) above between the L parts (75). With this mounting method, a rigid and secure connection is provided in the assembly areas of the modules thanks to the module fasteners used. The section view relative to the D-D axis in FIG. 20A is shown in FIG. 19-2C.

In case the upper module (63) and the lower module (64) have different material thicknesses and the same or different sections, the alternative mounting method of the modules (MM-05) is shown in FIG. 20-1. The only difference of this mounting method from the mounting methods (MM-02 and MM-04) described in the above sections (025 and 026) is that the reinforcement plate (70) is not used. In this method, the bolt holes (53) in the module lower and upper connection parts (50) and (58) are made to meet each other exactly. The section view according to the E-E axis in FIG. 20-1 A is shown in FIG. 20-12C. Everything else is as explained in sections (025 and 026).

The feature of the basic connection module (2) shown in FIG. 1 is that its cross section is the same as that of the lowest module of the tower. Its height can be one meter or more. In FIG. 21, perspective pictures of basic connection modules belonging to different sections are shown as an example.

Figure 21A:
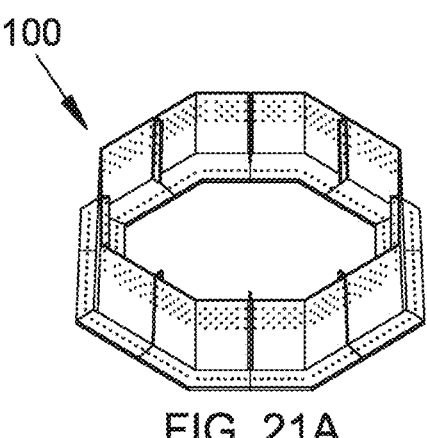
Figure 21B:
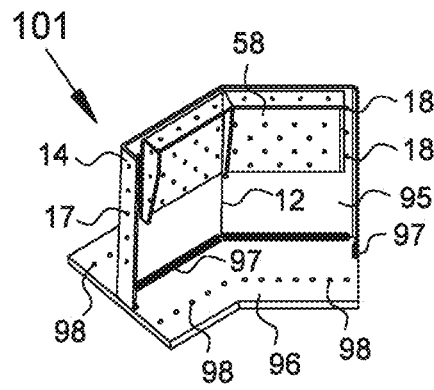
Figure 21C:
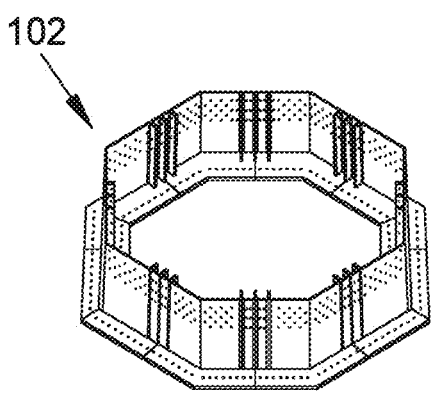
Figure 21D:
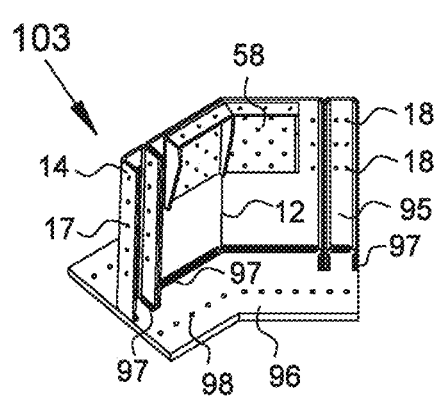
Figure 21E:
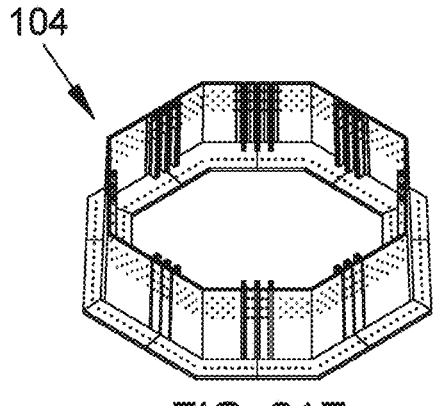
Figure 21F:
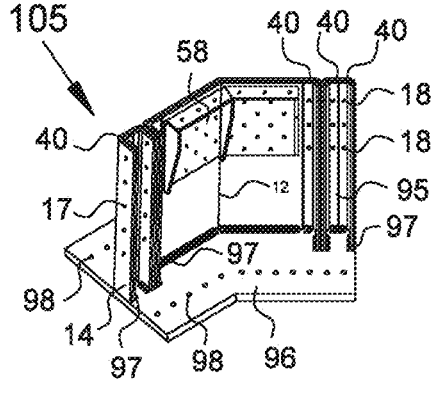

In FIG. 21A, perspective views of the basic connection module (100) to be used for the one-piece and single-walled module described above in section (018), and the segment (101) of this module (100) in FIG. 21 B are shown. Details of the flanges (12), bending line (14), bolt connection holes (17, 18 and 20) in the tower element (95) of the segment are as explained in sections (005) and (018, 18A, 18B and 18C) above. The tower element (95) is fixed by welding (97) from the inner and outer parts on the foundation flange plate (96), on which bolt holes (98) are provided for fixing it to the concrete foundation. Next, the submodule connection piece (58) is assembled as seen in FIG. 21 B. The assembly details of this part 58 are the same as the method described in section 018A above. Segments (101) are fixed to the concrete foundation with bolt holes (98) at the place where the plant will be installed, and to the other foundation segments with bolt holes (17). Then the lowest module of the tower is mounted to the basic connection module with bolt holes (17, 18 and 20). The mounting method here is the same as the mounting methods for similar sections described in sections (24, 25, 25A, 26 and 26A) above.

In FIG. 21 C, there are perspective views of the basic connection module (102) to be used for the multi-part and single-walled module described above in the section (019), and the segment (103) of this module (102) in FIG. 21 D. Details of the flanges (12), bending line (14), bolt connection holes (17, 18 and 20) in the tower elements (95 and 99) of the segment are given above (005), (007) and (019, 19A, 19B and 19C). as explained in the sections. Tower elements (95 and 99) are fixed by welding (97) from the inner and outer parts onto the foundation flange plate (96) on which bolt holes (98) are provided for fixing to the concrete foundation. Next, the submodule connection piece (58) is assembled as seen in FIG. 21 D. The assembly details of this part 58 are the same as the method described in section 018A above. The segments (103) are fixed to the concrete foundation with bolt holes (98) at the place where the plant will be installed, and to the other foundation segments with bolt holes (17). Then the lowest module of the tower is mounted to the basic connection module with bolt holes (17, 18 and 20). The mounting method here is the same as the mounting methods for similar sections described above in sections (24, 25, 25A, 26 and 26A).

In FIG. 21 E, there are perspective views of the basic connection module (104) to be used for the multi-part and multi-walled module described above in section (023), and the segment (105) of this module (104) in FIG. 21 F. Details of the flanges (12), bending line (14), bolt connection holes (17, 18 and 20) in the tower elements (34, 40, 95 and 99) of the segment above (005), (008) and (023, 23A, 23B). and 23C). The tower elements (34, 40, 95 and 99) are fixed by welding (97) from the inner and outer parts onto the foundation flange plate (96), on which bolt holes (98) are provided for fixing to the concrete foundation. Next, the submodule connection piece (58) is assembled as seen in FIG. 21 E. The assembly details of this part 58 are the same as the method described in section 018A above. The segments (105) are fixed to the concrete foundation with bolt holes (98) at the place where the plant will be installed, and to the other foundation segments with bolt holes (17). Then the lowest module of the tower is mounted to the basic connection module with bolt holes (17, 18 and 20). The mounting method here is the same as the mounting methods for similar sections described above in sections (24, 25, 25A, 26 and 26A).

Mounting of the top flange (9) and flange (9) to the top module (106) is shown in FIG. 22. FIG. 22A shows the enlarged view of the upper part of the top module (106) of the tower, the top flange (9) in FIG. 22B, and the perspective views of the assembly type in FIG. 22C. The bolt holes (108) on the top flange (9) meet each other exactly with the bolt holes (53) on the module upper edge connection part (58) located on the top module (106) and are mounted to each other in this way. Mounting of the top flange (9) with nacelle is done with bolt holes (109).

Entrance door details are shown in FIG. 23. FIG. 23A shows the perspective views of the entrance door (3) and reinforcement plate (4) in the lowest module (111). In FIG. 23B, the entrance door (3) has an enlarged perspective view. The entrance door (3) is produced from steel material in accordance with the segment (112) section of the lowest module. FIG. 23C shows the enlarged perspective views of the lower part of the module segment (112) with the door gap. Door reinforcement plates (4) shown in FIG. 23D are placed on the inner and outer surfaces of the module segment (112) in order to eliminate the weakness of the entrance door (3) gap in the module section. The strength in the door cavity is increased by fixing the reinforcement plates (4) and the bolt holes (113) in the module segment (112) to each other with bolts. The view of the reinforcement plate (4) placed on the outer surface of the segment (112) after the assembly is shown in FIG. 23E, and the view of the reinforcement plate (4) placed on its inner surface is shown in FIG. 23F.

FIG. 24 shows the mounting of reinforcement plates (115) for a single piece and single wall foundation module segment (114) as an example. The loads on the door reinforcement plate are transferred to the floor using the same method in all foundation module sections. The bottom module (111) door reinforcement plates (4) to pass the loads to the foundation segment is located in the cavity of the door module (112) under the basic segment (114) and the reinforcing plates inner and outer surfaces (115) are there. The reinforcement plates (115) and the base segment are fixed to each other through the bolt holes (116) located in the tower element (114) and to the foundation plate (117) with the welding seam (97). The base segment tower element (114) is shown in FIG. 24B, the reinforcement plate in FIG. 24A and the assembled form in FIG. 24C. In FIG. 24D, the enlarged version of the part inside the circle of the manufactured part in FIG. 24C is shown.

Ten different module structures (57, 65, 84, 84A, 88, 88A, 91, 91A, 94, 94A) above in sections (018, 019, 020, 021, 022 and 023) and in A, B, C, D clauses it was announced. One or more of these modules can be used to provide optimization in tower design. Some of these variations are shown as examples for towers made up of three modules in FIG. 25. Since 9,10,15 or more modules will be used in towers higher than 100 meters, the optimum solution can be achieved by choosing the appropriate number and structure of modules according to the decreasing material thicknesses upstream. The towers have a basic connection module (2) with the same cross section as the lowest module, an entrance door (3) and reinforcement plates (4) in the lowest module, and a top flange (9) at the top.

In FIG. 25A, single-walled modules (57) are used throughout the tower.

In FIG. 25B, there is a single walled module (65) in the lowest module of the tower. Single wall modules (65 and 57) are used in others. (034C) In FIG. 25C, there is a multi-walled module (84) in the lowest module of the tower. In others, multi-walled (84) and single-walled (57) modules were used.

In FIG. 25D, there is a multi-walled module (88) in the lowest module of the tower. In others, multi-wall (88) and single-walled (57) modules are used.

In FIG. 25E, there is a multi-walled module (91) in the lowest module of the tower. In others, multi-wall (91) and single-walled (65 and 57) modules were used.

In FIG. 25F, there is a multi-walled module (94) in the lowest module of the tower. In others, multi-wall (94 and 88) and single-walled (57) modules were used.

Finally, according to the invention, it is possible to build towers at desired heights. Tower weight can be reduced by using composite materials, especially in tower elements such as interior walls. In FIG. 11, an exemplary tower with a height of 12 m each of its modules (57, 84 and 94), a height of foundation module (104) of 1 m, and a total height of 145 m is shown. In the lower two modules, the segments are multi-part and multi-walled (94) modules, in the next three modules the segments are single-piece and multi-walled (84) modules, in the other modules single-piece and single-walled (57) modules are used. Material thickness of the modules decreases from bottom to top. The lowest module has an entrance door (3) and reinforcement plates (4). On the top module, there is a top flange (9) for nacelle connection.

INDUSTRIAL APPLICATION OF THE INVENTION

The modular tower to be used for wind turbines can be applied to the industry by being produced in factories with the necessary machinery and equipment and assembled in the power plant area.

The invention claimed is:

1. A modular tower (1), comprising:
a plurality of modules (57, 84) each having a polygonal cross-section that narrow from bottom to top of the modular tower (1);
each module (57, 84) comprises a plurality of tower elements (22) made of steel or composite material;

the tower elements (22) are mounted laterally to each other; wherein as tower height increases, the tower elements (22) of the modules (57, 84) have one or more inner walls (30) each fixed to a single respective tower elements (22) to increase material thickness of the tower elements (22);

the tower elements (22) of the modules (57, 84) are mounted to each other vertically on y axis by module connectors (50), wherein the module connectors (50) transmit forces acting on the modular tower (1) to a foundation uninterruptedly along the modules (57, 84) and ensure installation of the modules (57, 84);

the module connectors (50) are factory installed on modules (57, 84) of the tower elements (22);

a top flange fixed to a topmost module, which allows mounting a nacelle to the modular tower (1); and a foundation module, which has a same cross-section as a lowest module;

wherein the plurality of modules (84) having multi-walls and consisting of segments (82) in which at least one inner wall (30) is mounted on an inner surface of the tower elements (22) with wall bolts (37);

wherein an outer circumference of an upper edge section of the module (84) is exactly equal to an outer circumference of a lower edge section of an upper module;

wherein an outer circumference of a lower edge section of the module (84) is exactly equal to an outer circumference of an upper edge section of a lower module; and wherein thanks to these features of their cross-sections, it is ensured that the modules (84) are mounted to each other only face-to-face.

2. The modular tower (1) according to claim 1,
wherein the tower elements (22) are in conical form that narrows from bottom to top;

wherein the tower elements (22) have a tower bending line bent in a longitudinal direction of the tower elements (22), with a tower bending angle (13) depending on a number of sides of an equilateral polygon forming a polygonal cross-section of the modules (57, 84), right in a middle of the tower elements (22);

to ensure that the tower elements (22) of the modules (57, 84) are attached to each other laterally, the tower elements (22) have flanges (14) bent at a 90 degree angle (15) on both sides, wherein a height of the flanges (14) is equal to a height of the tower elements (22);

wherein the tower elements (22) have flange bolt holes (16, 17) on its flanges (14) for mounting it to other tower elements (22) and connector bolt holes (18, 19, 20) on its main surfaces for mounting the module connectors (50);

wherein the tower elements (22) are used as an outer wall in multi-wall segments; and wherein the tower elements (22) have tower bolt holes (21, 23) for mounting at least one of the inner walls (30).

3. The modular tower (1) according to claim 1, wherein:
the inner wall (30) fixed to the tower elements (22) and used as an internal wall is in a tapered form that narrows from bottom to top;

wherein the inner wall (30) fixed to the tower elements (22) has a wall bending line (31) bent in a longitudinal direction of the inner wall (30), with a wall bending angle (32) dependent on a number of sides of an equilateral polygon forming the polygonal cross-section of the module (57, 84), right in a middle of the inner wall (30); wherein the wall bending angle (32) is the same as a tower bending angle (13) of the tower elements (22);

wherein the inner wall (30) fixed to the tower elements (22) has bolt holes that enable it to be secured to the tower elements (22).

4. The modular tower (1) according to claim 1, wherein the module connector (50) has a connector bending line (51) bent with a connector bending angle in a middle part of the module connector (50), a connector flange (52) bent at 90 degrees in a lower part of the module connector (50), and a plurality of connector flange bolt holes (53) that allow the module connector (50) to be fixed to the module connector (50) of any other tower elements (22); the module connector (50) has reinforcement parts (55) fixed with a welding seam (54) on both sides and in the middle.

5. The modular tower (1) according to claim 1, wherein:

the plurality of modules (57) narrow from the bottom up when installation of the tower elements (22) to each other through flange bolt holes (16) on flanges (14) of the tower elements (22) with bolts (56) is completed;

wherein an outer circumference of an upper edge section of the module (57) is exactly equal to an outer circumference of a lower edge section of an upper module; wherein an outer circumference of a lower edge section of the module (57) is exactly equal to an outer circumference of an upper edge section of a lower module; and wherein thanks to these features of their cross-sections, it is ensured that the modules (57) are mounted to each other only face-to-face.

\* \* \* \* \*